(12) United States Patent
Sogo et al.

(10) Patent No.: US 9,477,964 B2
(45) Date of Patent: Oct. 25, 2016

(54) MARKETING SYSTEM AND MARKETING METHOD

(71) Applicant: AdInte, INC., Kyoto (JP)

(72) Inventors: Shinji Sogo, Kyoto (JP); Shingo Fujino, Kyoto (JP)

(73) Assignee: Adinte, INC., Kyoto (JP)

(*) Notice: Subject to any disclaimer, the term of this patent is extended or adjusted under 35 U.S.C. 154(b) by 0 days.

(21) Appl. No.: 14/891,977

(22) PCT Filed: Jun. 14, 2015

(86) PCT No.: PCT/JP2015/067098
§ 371 (c)(1),
(2) Date: Nov. 18, 2015

(87) PCT Pub. No.: WO2015/190611
PCT Pub. Date: Dec. 17, 2015

(65) Prior Publication Data
US 2016/0189187 A1 Jun. 30, 2016

(30) Foreign Application Priority Data
Jun. 14, 2014 (JP) ................. 2014-122943

(51) Int. Cl.
*H04B 7/00* (2006.01)
*G06Q 30/02* (2012.01)
*H04W 84/12* (2009.01)
(52) U.S. Cl.
CPC .......... *G06Q 30/0205* (2013.01); *G06Q 30/02* (2013.01); *H04W 84/12* (2013.01)
(58) Field of Classification Search
USPC ........................................ 455/41.2
See application file for complete search history.

(56) References Cited

FOREIGN PATENT DOCUMENTS

| JP | 2002041758 A | | 2/2002 |
|---|---|---|---|
| JP | 2005148289 A | | 6/2005 |
| JP | 2005165446 A | * | 6/2005 |
| JP | 2006309280 A | * | 11/2006 |
| JP | 2007293451 A | | 11/2007 |
| JP | 2011060059 A | * | 3/2011 |
| JP | 2012216167 A | | 11/2012 |
| JP | 2012226774 A | | 11/2012 |
| JP | 2013242718 A | | 12/2013 |
| JP | 2014185876 A | | 10/2014 |

OTHER PUBLICATIONS

International Search Report dated Jul. 28, 2015 from corresponding International Patent Application No. PCT/JP2015/0697098; 9 pgs.
Decision of Patent dated Feb. 25, 2015 from corresponding Japanese patent application No. JP2014-122943; 6 pgs.
Notice of reason for Rejection dated Oct. 22, 2014 from corresponding Japanese patent application No. JP2014-122943; 6 pgs.

* cited by examiner

Primary Examiner — Ankur Jain
(74) Attorney, Agent, or Firm — Maier & Maier, PLLC

(57) ABSTRACT

The transmission part transmits communication information including the terminal ID of the user terminal, the unit ID of the wireless unit and radio wave intensity to a server, when the user terminal performs short-distance wireless communication to the wireless unit through the radio wave. The collection part collects a chronological change of the radio wave intensity in the terminal ID concerned with the unit ID. The calculation part calculates the flow line that the user moved in the area of the wireless unit and the flow time when the user stays on a part of the flow line. The estimation part estimates action information indicating that the user did actually on the area of the wireless unit. The analysis part analyzes the user's attribute information including the user's preference based on the user's action information and the installation attribute information.

5 Claims, 17 Drawing Sheets

FIG. 14

| terminal ID | unit ID | radio wave intensity | a part of flow line | flow time | action information | installation attribute information | user's attribute information | |
|---|---|---|---|---|---|---|---|---|
| ... | ... | ... | ... | ... | ... | ... | ... | |
| aaa | DDD | Near | X1, Y1 | 2 minutes | approach | clothes | clothes lover | |
| ... | ... | ... | ... | ... | ... | ... | ... | |
| aaa | EEE | Near | X2, Y2 | 1 minute | pass | clothes store entrance | clothes lover | |
| aaa | FFF | Near | X3, Y3 | 2 minutes | approach | clothes shelf | clothes lover | |
| aaa | GGG | Far | X4, Y4 | 1 minute | pass | accessory shelf | clothes lover | |
| aaa | GGG | Near | X4, Y4 | 5 minutes | selection of product | accessory shelf | accessory lover | clothes lover |
| aaa | HHH | Near | X5, Y5 | 2 minutes | approach | cash register | accessory lover | clothes lover |
| aaa | III | Near | X6, Y6 | 1 minute | pass | clothes store exit | accessory lover | clothes lover |
| ... | ... | ... | ... | ... | ... | ... | ... | |

1400

MARKETING SYSTEM AND MARKETING METHOD

CROSS REFERENCE TO RELATED APPLICATIONS

This application claims priority to Japanese Patent Application No. 2014-122943 filed on Jun. 14, 2014, the entire contents of which are incorporated by reference herein. This application is a U.S. nationalization under 35 U.S.C. .sctn.371 of International Application No. PCT/JP2015/67098, filed Jun. 14, 2015. The disclosure set forth in the referenced application is incorporated herein by reference in its entirety.

TECHNICAL FIELD

The present invention relates to a marketing system and a marketing method.

BACKGROUND ART

Conventionally, techniques for using marketing methods of the selection of products exist a lot by researching that customers stayed in what kind of shop by what kind of walk route and purchased what kind of product. For examples, Patent Literature 1, Patent Literature 2, Patent Literature 3, Patent Literature 4, Patent Literature 5, Patent Literature 6, Patent Literature 7, and Patent Literature 8 disclose marketing systems.

PRIOR ART DOCUMENTS

Patent Literature

Patent Literature 1: Japanese Unexamined Patent Application Publication No. 2002-41758
Patent Literature 2: Japanese Unexamined Patent Application Publication No. 2005-148289
Patent Literature 3: Japanese Unexamined Patent Application Publication No. 2007-293451
Patent Literature 4: Japanese Unexamined Patent Application Publication No. 2006-309280
Patent Literature 5: Japanese Unexamined Patent Application Publication No. 2005-165446
Patent Literature 6: Japanese Unexamined Patent Application Publication No. 2011-60059
Patent Literature 7: Japanese Unexamined Patent Application Publication No. 2012-226774
Patent Literature 8: Japanese Unexamined Patent Application Publication No. 2013-242718

SUMMARY OF INVENTION

Problems to be Solved by the Invention

The conventional marketing system acquires position information of the terminal by using a GPS function pre-provided a terminal, but there are problems that the GPS communication needs several tens of seconds when measuring the correct position information of the terminal, and the position information cannot be acquired in building or shop. In the other marketing system there are problems that the communication distance of a tag being wireless communicable is short, many tags are needed, the cost is high, and the like.

In late years, terminals such as smartphone are spread, and it is cheap to purchase a wireless unit being able to perform short-distance wireless communication to the terminal via radio signal easily. If using the wireless unit, there is some possibility of constructing a marketing system which has not existed conventionally.

Accordingly, the present invention was created as a solution for the problems and aims at providing a marketing system and a marketing method which can analyze user's attribute information including user's preference concretely by user's action history.

Solution to Problem

After conducting rigorous and repeated research, the present inventors have completed a novel marketing system and a novel marketing method. Namely, the marketing system in the present invention comprises a first communication part, a second communication part, a transmission part, a collection part, a calculation part, an estimation part, and an analysis part. The first communication part is provided to a user terminal owned by a user, and sends radio wave including the terminal ID of the user terminal regularly. The second communication part is provided to a Wi-Fi sensor installed in a specific area, and receives radio wave sent by the user terminal of the user who entered in the area. The transmission part is provided to the Wi-Fi sensor, and transmits communication information including the terminal ID of the user terminal, the unit ID of the Wi-Fi sensor and radio wave intensity to a server through a network, the radio wave intensity being the intensity of the radio wave and meaning a proximity sorted for plural stages depending on the distance between the user terminal and the Wi-Fi sensor when the user terminal performs short-distance wireless communication to the Wi-Fi sensor through the radio wave. The collection part is provided to the server, and collects a chronological change of the radio wave intensity in the terminal ID of the communication information concerned with the unit ID of the communication information when receiving the communication information. The calculation part is provided to the server, draws a circle or a ring of which a radius is the distance corresponding to the radio wave intensity on the center of the Wi-Fi sensor of the unit ID virtually based on the collected radio wave intensity in the terminal ID concerned with the unit ID, calculates position information on the circle or the ring as a part of the flow line on which the user moved, and calculates the flow time when the user stays on the part of the flow line based on the chronological change of the radio wave intensity. The estimation part is provided to the server, and estimates user's action information indicating that the user did actually on the area of the Wi-Fi sensor of the unit ID based on the part of the flow line and the flow time. The analysis part is provided to the server, and analyzes user's attribute information including user's preference based on the estimated user's action information and installation attribute information indicating the attribute of the installation of the Wi-Fi sensor, the installation attribute information pre-provided to the unit ID of the Wi-Fi sensor. The Wi-Fi sensor can be exchanged with a Beacon terminal. In the case, a first communication part is provided to a user terminal owned by a user, and receives radio wave. A second communication part is provided to a Beacon terminal installed in a specific area, and sends radio wave including the unit ID of the Beacon terminal regularly. The transmission part is provided to the user terminal.

The present invention can be provided as a marketing method. Namely, the marketing method in the present invention comprises a first communicating step, a second communicating step, a transmitting step, a collecting step, a calculating step, an estimating step, and an analyzing step. The first communicating step at a user terminal owned by a user sends radio wave including the terminal ID of the user terminal regularly. The second communicating step at a Wi-Fi sensor installed in a specific area receives radio wave sent by the user terminal of the user who entered in the area. The transmitting step at the Wi-Fi sensor transmits communication information including the terminal ID of the user terminal, the unit ID of the Wi-Fi sensor and radio wave intensity to a server through a network, the radio wave intensity being the intensity of the radio wave and meaning a proximity sorted for plural stages depending on the distance between the user terminal and the Wi-Fi sensor when the user terminal performs short-distance wireless communication to the Wi-Fi sensor through the radio wave. The collecting step at the server collects a chronological change of the radio wave intensity in the terminal ID of the communication information concerned with the unit ID of the communication information when the communication information is received. The calculating step at the server draws a circle or a ring of which a radius is the distance corresponding to the radio wave intensity on the center of the Wi-Fi sensor of the unit ID virtually based on the collected radio wave intensity in the terminal ID concerned with the unit ID, calculates position information on the circle or the ring as a part of the flow line on which the user moved, and calculates the flow time when the user stays on the part of the flow line based on the chronological change of the radio wave intensity. The estimating step at the server estimates user's action information indicating that the user did actually on the area of the Wi-Fi sensor of the unit ID based on the part of the flow line and the flow time. The analyzing step at the server analyzes user's attribute information including user's preference based on the estimated user's action information and installation attribute information indicating the attribute of the installation of the Wi-Fi sensor, the installation attribute information pre-provided to the unit ID of the Wi-Fi sensor. Similarly, the Wi-Fi sensor can be exchanged with a Beacon terminal. In the case, the first communicating step at a user terminal owned by a user receives radio wave. The second communicating step at a Beacon terminal installed in a specific area sends radio wave including the terminal ID of the Beacon terminal regularly. The transmitting step at the user terminal transmits.

Advantageous Effects of Invention

According to the present invention, the present invention can analyze user's attribute information including user's preference concretely by user's action history.

BRIEF DESCRIPTION OF DRAWINGS

FIG. 14 is a view indicating an example of a shop visit table according to the invention.

DETAILED DESCRIPTION

The preferred embodiments of a marketing system and a marketing method in the present invention will be explained below according to the attached drawings; thereby the present invention will be clearly understood. The embodiments below are examples materializing the present invention, and do not limit the technical scope of the present invention.

Figure 1:
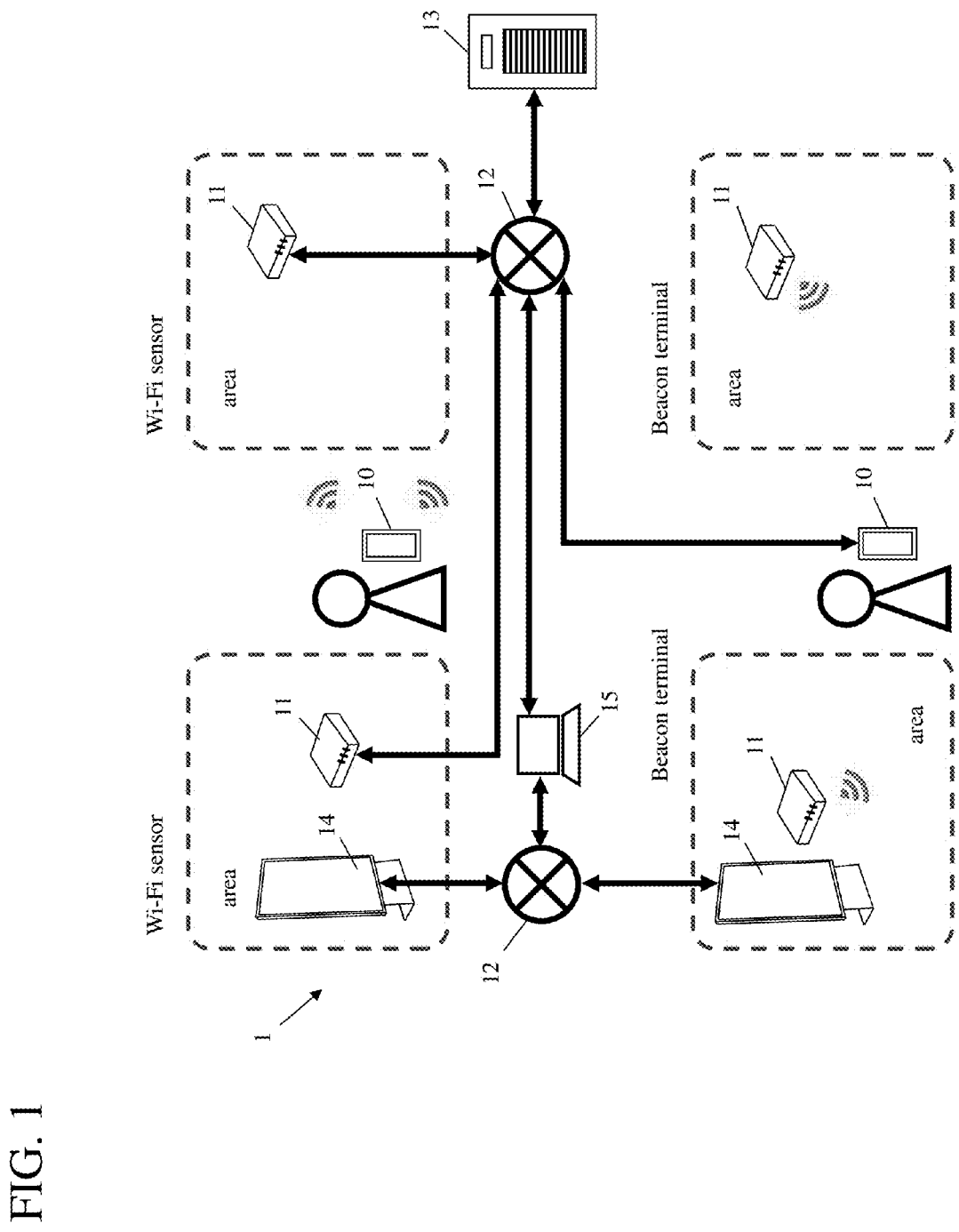
FIG. 1 is an outline diagram indicating an example of a marketing system according to the invention.

As shown in FIG. 1, a marketing system 1 basically includes a user terminal 10 owned by a user, plural wireless units 11 installed in each specific area, and a server 13 being able to communicate with the user terminal 10 or the wireless unit 11 through a network 13.

The user terminal 10 includes a mobile terminal such as a communication terminal of the cellular telephone, a hand-held terminal (smartphone) with a touch panel, a tablet type terminal, a small note PC, or the like, and includes a display part (output part) displaying a screen and a reception part (input part) receiving a input of predetermined instructions by the operation of the user. When the user terminal 10 is wireless LAN specification, a first communication part which can perform short-distance wireless communication to the wireless unit 11 is provided to the user terminal 10 beforehand. When the user terminal 10 is a smartphone or a tablet type terminal, the touch panel serves as the display part and the reception part. In the following, the user terminal 10 is explained as a smartphone.

The wireless unit 11 includes a second communication part which can perform short-distance wireless communication to the user terminal 10. The short-distance wireless communication means that a transmission or a reception of data to the wireless unit in several decades cm-one hundred several decades m by using radio wave of radio signal, and the user terminal 10 performing short-distance wireless communication to the wireless unit 11 means that the user terminal 10 exists near the wireless unit 11. The above range of radio wave reception is changed depending on specifications and performances of the user terminal 10 and the wireless unit 11.

The communication mode of short-distance wireless communication between the user terminal 10 and the wireless unit 11 is different depending on a kind of wireless unit 11. For example, when the wireless unit 11 is a Wi-Fi sensor receiving radio wave, in FIG. 1, the first communication part of the user terminal 10 sends regularly radio wave to search a repeating device (access point) of the wireless LAN (Local Area Network) communication, and the second communication part of the wireless unit 11 receives radio wave from the first communication part. Therefore a short-distance wireless communication between the both is performed. In this case, the wireless unit 11 is provided with a transmission part transmitting communication information including the terminal ID of the user terminal, the unit ID of the Wi-Fi sensor and radio wave intensity to a server 13.

The Wi-Fi is the name indicating that the interconnectivity between the wireless LAN units has been authenticated by wireless LAN-related trade group Wi-Fi Alliance, and is written to Wi-Fi or the like. About the interconnectivity between the wireless LAN units with using IEEE 802.11 series being a communication standard, a Wi-Fi logo is used for the units having been authenticated by Wi-Fi Alliance. The Wi-Fi sensor functions as radio wave monitor of the short-distance wireless communication. In addition, for example, IEEE 802.11 series can include IEEE 802.11a, IEEE 802.11b, IEEE 802.11 g, IEEE 802.11n, IEEE 802.11ac, or the like.

When the wireless unit 11 is a Beacon terminal sending radio wave, the second communication part of the wireless unit 11 sends radio wave including the unit ID of the Beacon terminal regularly, and the first communication part receives radio wave from the second communication part. Therefore a short-distance wireless communication between the both is performed. In this case, the transmission part is provided to the user terminal 10.

The short-distance wireless communication with the Beacon terminal is Bluetooth® Low Energy (BLE) communication. The BLE communication means that one of the expansion specifications of a short-distance wireless communication technology Bluetooth®, the BLE communication uses radio wave of 2.4 MHz zone (ISM band), and it is possible to perform wireless communication of up to 1 Mbps at ultra low electric power.

The wireless unit 11 is installed in an area desired to analyze user's action history. When a digital signage 14 (Digital Signage) exists to the area, the wireless unit 11 is installed near the digital signage 14, or is linked to the digital signage 14. The digital signage 14 is advertisement media displaying videos or screens with a plane display or a projector. The digital signage 14 is usually connected to a control terminal 15 controlling screens (videos) through the network 12, and the control terminal 15 receives screen information from the server 13 or other terminal through the network 12, and distributes to the digital signage 14. The digital signage 14 may be connected to the control terminal 15 directly. The digital signage 14 means an electronic signboard in a broad sense such as outdoor advertisement, transportation advertisement, milestone, indoor and outdoor guidance signboard, in-store promotion, video display, or the like. When the area is a shop of merchandise, the wireless unit 11 is installed near the register of the shop or a shop shelf.

The server 13 is a computer used generally, and can perform communication to the user terminal 10 or the wireless unit 11 with wireless or a cable. The server 13 includes a memory storing date, each part (a calculation part, an estimation part, an analysis part) operating each kind, and a notice part sending information to the user terminal 10 through the network 12.

The user terminal 10, the wireless unit 11, and the server 13 include CPU, ROM, RAM, HDD, SSD, and the like (not shown), and for example, CPU uses RAM as a working area and executes program stored in ROM, RAM, HDD, SSD, etc. About the undermentioned parts, CPU executes the program for materializing the undermentioned parts.

Figure 2:
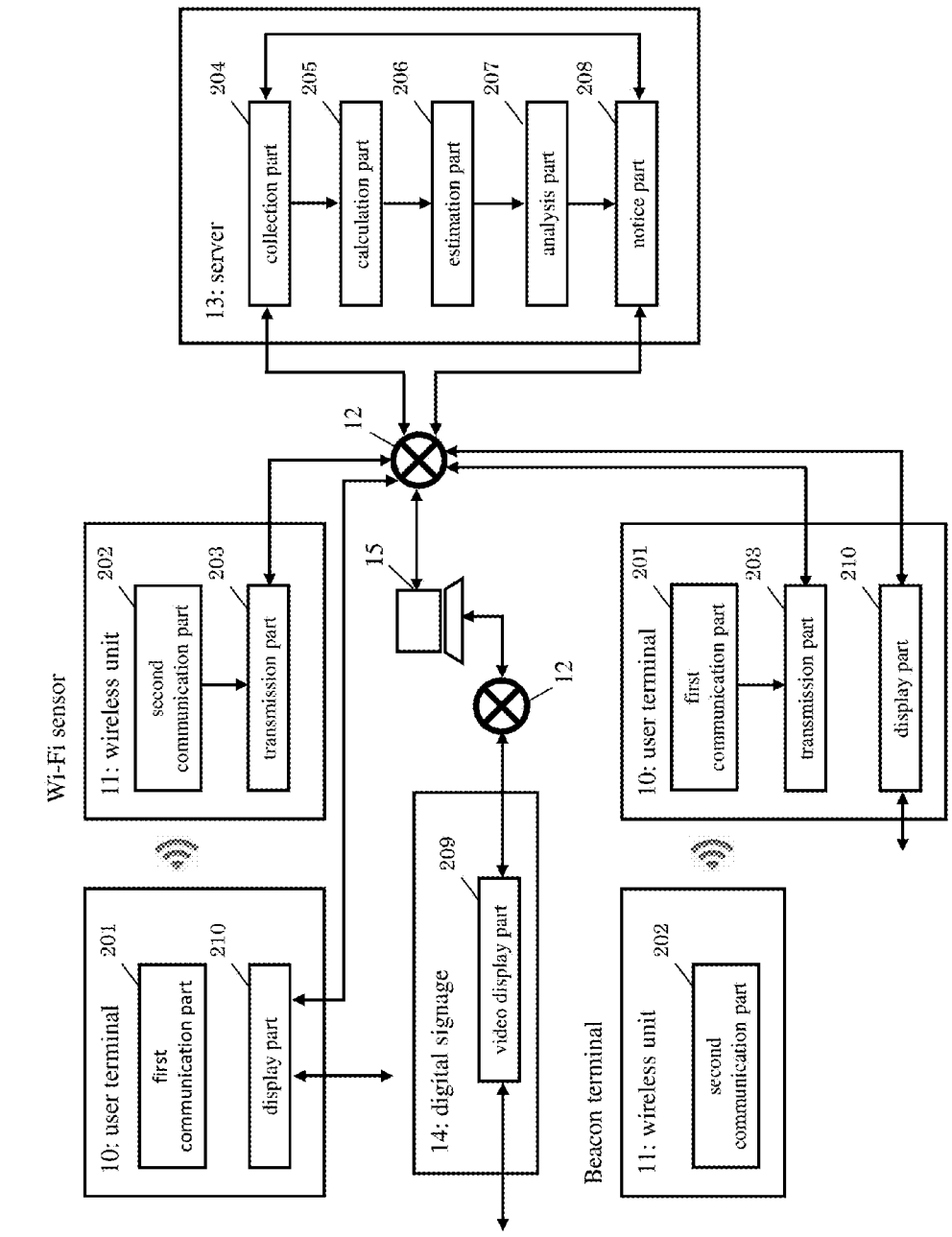
FIG. 2 is a functional block diagram of an example of a marketing system according to the invention.
Figure 3:
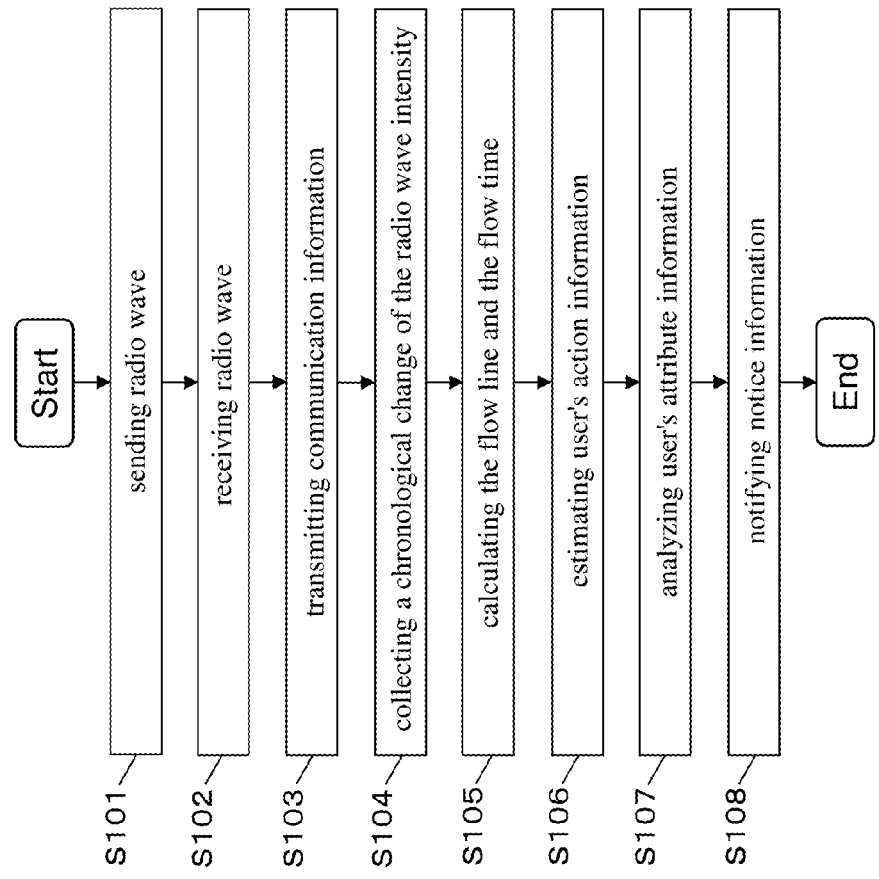
FIG. 3 is a flowchart indicating execution steps according to the invention.

As referring to FIG. 2, FIG. 3, the structure and execution steps in the embodiment of the present invention are explained. First, there are explained when the wireless unit 11 is a Wi-Fi sensor. In this case, a first communication part 201 of a user terminal 10 owned by a user sends radio wave including the terminal ID of the user terminal 10 regularly (FIG. 3, S101). The terminal ID is a MAC address, and is identification information of the user terminal 10, and is not identification information of the user.

Figure 4:
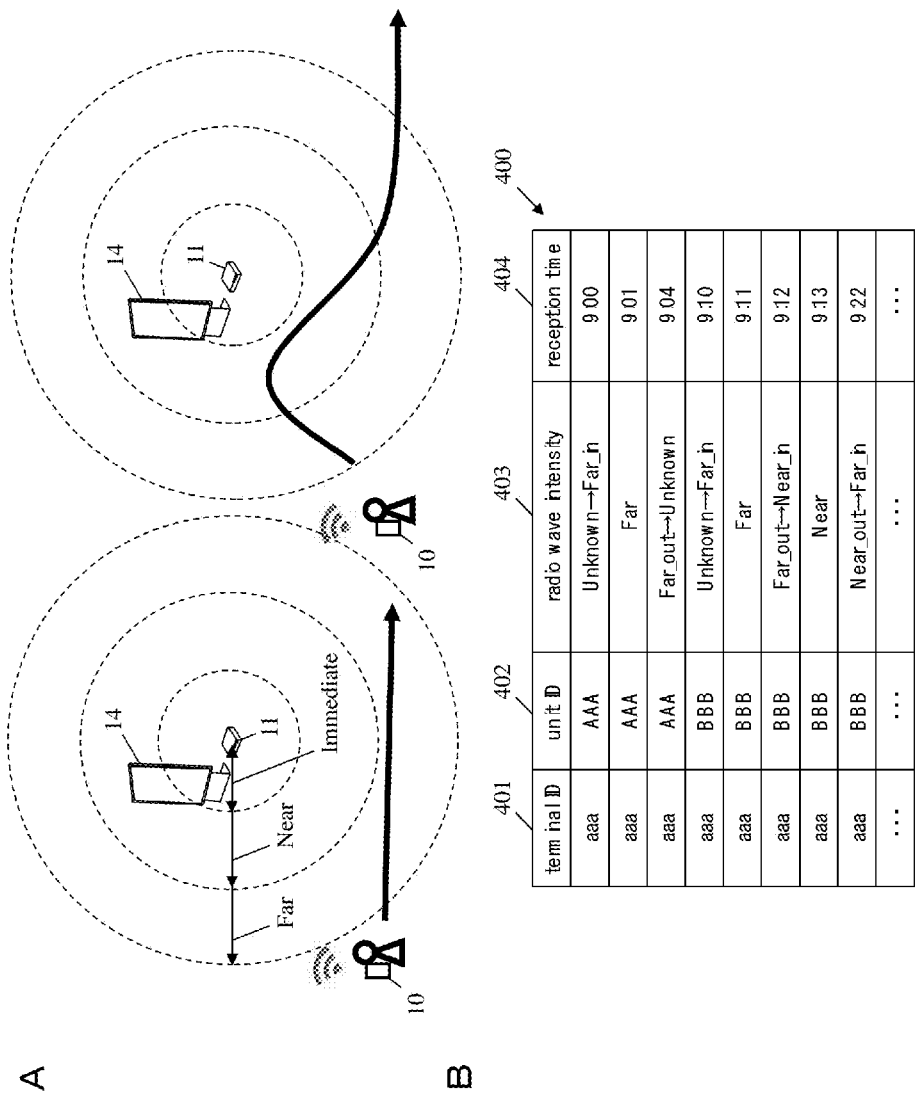
FIG. 4A is a view indicating an example of the position relationship between a digital signage and a wireless unit according to the invention, and a user terminal.
FIG. 4B is a view indicating an example of a first communication information table according to the invention.

As shown in FIG. 4A, a digital signage 14 is installed in each area of a specific passage, and a Wi-Fi sensor is installed in each digital signage 14. The each digital signage 14 displays a different screen (initial setting screen, initial setting video) respectively. When the user owning the user terminal 10 passes near a first digital signage 14, a second communication part 202 of a first Wi-Fi sensor 11 installed in the first digital signage 14 receives the sent radio wave (FIG. 3, S102). Therefore the user with the user terminal 10 would enter within the range of radio wave reception of the first Wi-Fi sensor 11. And the first communication part 201 attached to the user terminal 10 is used effectively, so that it is possible to reduce the number of parts comprising the marketing system and the cost.

When the second communication part 202 of the first Wi-Fi sensor 11 receives the radio wave, a transmission part 203 of the first Wi-Fi sensor 11 transmits communication information (Wi-Fi date) including the terminal ID of the user terminal 10, the unit ID of the first Wi-Fi sensor 11 and radio wave intensity (RSSI: Received Signal Strength Indicator) to the server 13 through the network 12 (FIG. 3, S103).

For example, the transmission part 203 acquires the terminal ID (e.g., MAC address, "aaa") included in the received radio wave, and the radio wave intensity (e.g., "Unknown→Far_in").

The intensity of the radio wave in the short-distance wireless communication becomes stronger, the distance between the user terminal 10 sending radio wave and the Wi-Fi sensor 11 receiving the radio wave becomes shorter. The radio wave intensity means a proximity sorted for plural (e.g., four) stages according to the distance. The radio wave intensity shows "Immediate", "Near", "Far", or "Unknown" in the order that the radio wave intensity is strong. When the user terminal 10 goes in the range of radio wave reception of the Wi-Fi sensor 11 first, the radio wave intensity becomes "Unknown→Far_in". When the user terminal 10 goes out the range of radio wave reception of the Wi-Fi sensor 11, the radio wave intensity becomes "Far_out→Unknown".

Next, the transmission part 203 acquires the unit ID (e.g., "AAA") pre-stored in a specific memory of the first Wi-Fi sensor 11. And the transmission part 203 generates communication information including the terminal ID, the unit ID, and the radio wave intensity acquiring, and transmits the communication information to the server 13 through the network 12.

When the server 13 receives the communication information, a collection part 204 of the server 13 collects a chronological change of the radio wave intensity ("Unknown→Far_in") in the terminal ID ("aaa") of the communication information concerned with (relative to) the unit ID ("AAA") of the communication information when receives the communication information (FIG. 3, S104).

For example, the collection part 204 receiving the communication information refers to a first communication information table pre-stored in a specific memory. As shown in FIG. 4B, the first communication information table 400 includes terminal ID 401, unit ID 402, radio wave intensity 403, and reception time 404 when the communication information (or radio wave) is received as items.

The collection part 204 stores the terminal ID ("aaa") of the user terminal 10, the unit ID ("AAA"), the radio wave intensity ("Unknown→Far_in"), and the reception time (e.g., "9:00") in each item of the first communication information table 400 respectively. The collection part 204 continues to receive the communication information in the terminal ID ("aaa") from the transmission part 203 of the first Wi-Fi sensor 11, when the radio wave intensity in the communication information of the terminal ID ("aaa") changes, the collection part 204 stores the changed radio wave intensity and the reception time when the radio wave intensity changed in the first communication information table 400.

For example, as shown in FIG. 4A, when the user passed near the first digital signage 14 without approaching to the first digital signage 14 of the first Wi-Fi sensor 11, the radio wave intensity in the unit ID ("AAA") of the first digital signage 14 changes "Unknown→Far_in", "Far", and "Far_out→Unknown". So, as shown in FIG. 4B, the collection part 204 stores the reception time "9:01" corresponding to the radio wave intensity "Far" in the item of the radio wave intensity, and stores the reception time "9:04" corresponding to the radio wave intensity "Far_out→Unknown" in the item of the radio wave intensity, As shown in FIG. 4A, when the user passed through the first Wi-Fi sensor 11 and entered within the range of radio wave reception of a second Wi-Fi sensor 11, the user had an interest in a screen of a second digital signage 14 at the second Wi-Fi sensor 11, the user accesses to the second digital signage 14, and left. In this case, the collection part 204 continues to receive the communication information in the terminal ID ("aaa") from the transmission part 203 of the second Wi-Fi sensor 11, so that the collection part 204 collects a chronological change of the radio wave intensity in the unit ID ("BBB") of the second Wi-Fi sensor 11. So, the radio wave intensity in the unit ID ("BBB") of the second Wi-Fi sensor 11 changes "Unknown→Far_in", "Far", "Far_out→Near_in" . . . . As shown in FIG. 4B, the collection part 204 stores the reception time "9:10" corresponding to the radio wave intensity "Unknown→Far_in" in the item of the radio wave intensity, stores the reception time "9:11" corresponding to the radio wave intensity "Far" in the item of the radio wave intensity, and stores the reception time "9:12" corresponding to the radio wave intensity "Far_out→Near_in" in the item of the radio wave intensity. Therefore it is possible to take the user position in each area of the Wi-Fi sensor 11 as a history (log).

When the collection part 204 finishes to collect a chronological change of the radio wave intensity in one unit ID or plural unit ID concerned with the terminal ID ("aaa"), a calculation part 205 calculates a part of the flow line on which the user moved based on the collected radio wave intensity of the terminal ID concerned with the unit ID, and calculates the flow time when the user stays on the part of the flow line based on the chronological change of the radio wave intensity (FIG. 3, S105).

Figure 5:
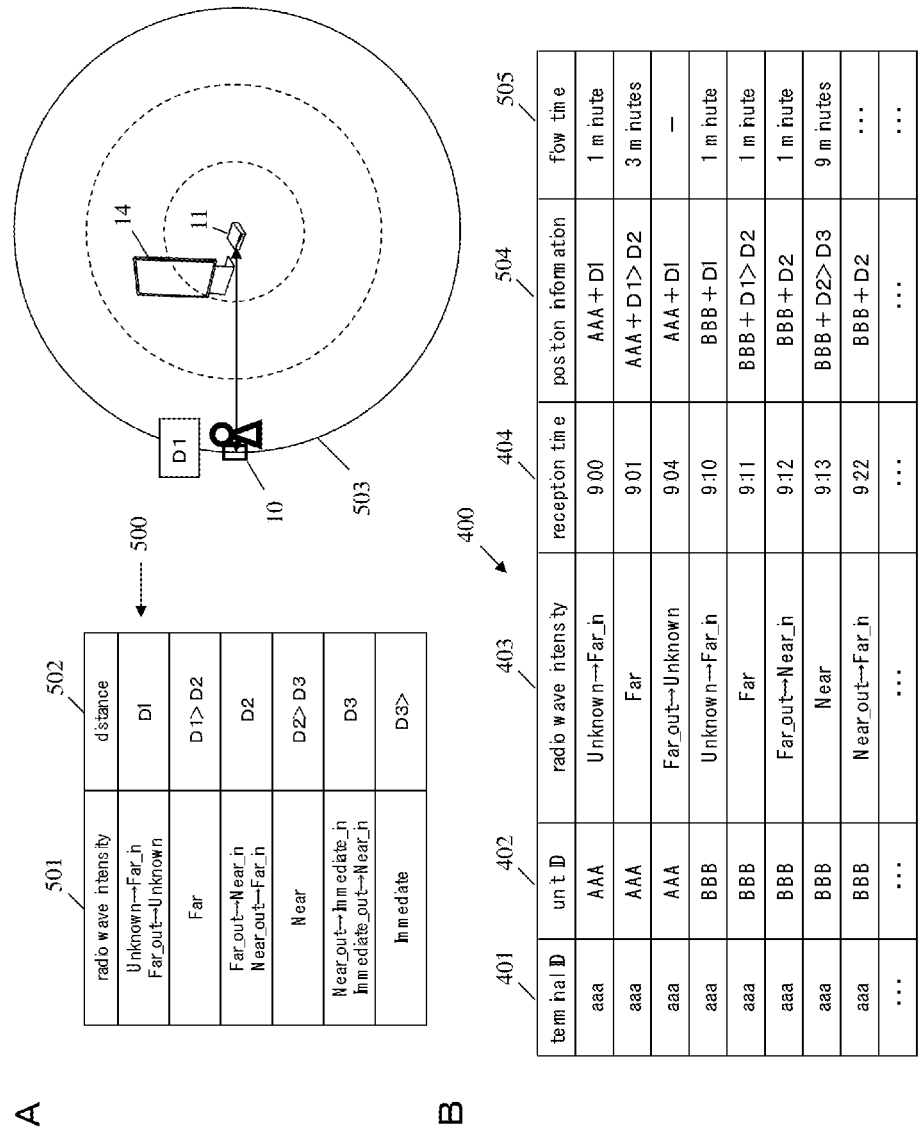
FIG. 5A is a view indicating an example of a distance table according to the invention and an example of a distance relationship between a user terminal and a wireless unit.
FIG. 5B is a view indicating an example of a calculation of a user's flow line and a flow time in a first communication information table.

For example, the calculation part 205 refers to a distance table pre-stored in a specific memory. As shown in FIG. 5A, the distance table 500 includes a specific radio wave intensity 501 and a distance 502 being receivable with the radio wave intensity 501. In the four stages, one distance indicating the border of the range of radio wave reception is stored in the radio wave intensity indicating whether the user go in or out the range of radio wave reception. For example, "D1" is stored in "Unknown→Far_in" and "Far_out→Unknown", "D2" is stored in "Far_out→Near_in" and "Near_out→Far_in", and "D3" is stored in "Near_out→Immediate_in" and "Immediate_out→Near_in" (D1>D2>D3). And the distance indicating the range of radio wave reception is stored in a specific radio wave intensity. For example, "D1>D2" is stored in "Far", "D2>D3" is stored in "Near", and "D3>" is stored in "Immediate". The calculation part 205 collates the radio wave intensity 404 of the first communication information table 400 with the radio wave intensity 501 of the distance table 500, and acquires the distance 502 ("D1") corresponding to the collated radio wave intensity 501 (e.g., "Unknown→Far_in").

Next, the calculation part 205 combines the unit ID ("AAA") of the first communication information table 400 with the distance 502 ("D1") of the radio wave intensity 403 corresponding to the unit ID. As shown in FIG. 5A, the calculation part 205 draws a circle 503 of which a radius is the combined distance 502 ("D1") on the center of the first Wi-Fi sensor 11 of the unit ID ("AAA") virtually, and calculates position information on the circle 503 as a part of the flow line on which the user moved. When the radio wave intensity is "Far", the calculation part 205 draws a ring of which a radius is the distance 502 with the width ("D1>D2") on the center of the first Wi-Fi sensor 11 of the unit ID ("AAA") virtually, and calculates position information on the ring as a part of the flow line on which the user moved. Because the radio wave is non-oriented, the position information means the range on the circle or the ring. Therefore it is possible to roughly estimate a part of the flow line on which the user moved in the area of the Wi-Fi sensor 11 of the unit ID.

As shown in FIG. 5B, the calculation part 205 calculating the part of the flow line provides position information 504 with a next item of the reception time 404 of the first communication information table 400, and stores the calculated position information (e.g., "AAA+D1") in the position information 504. The calculation part 205 calculates and stores the position information 504 concerned with all radio wave intensity in one unit ID 402 ("AAA"), it is possible to calculate all of these position information 504 as the flow line on which the user moved in the area of the unit ID 402. The kind of the position information is not limited in particular, the above case is combination the unit ID 402 and the distance 502, if the installed position of the unit ID 402 is pre-registered, more concrete position information may be adopted by combining the installed position with the distance 502.

Next, the calculation part 205 calculates the flow time when the user stays on the part of the flow line based on the radio wave intensity 403 and the reception time 404 in the first communication information table 400. For example, when the first radio wave intensity is "Unknown→Far_in", the first reception time is "9:00", the next radio wave intensity is "Far" and the next reception time is "9:01", so the time "1 minute" is obtained by subtracting the first reception time "9:00" from the next reception time "9:01" and means the flow time when the user stayed on the part of the flow line "AAA+D1" corresponding to the first radio wave intensity. Therefore the calculation part 205 calculates the flow time when the user stays on the part of the flow line by subtracting the reception time before the radio wave intensity changes from the reception time after the radio wave intensity changed. And as shown in FIG. 5B, the calculation part 205 calculating the flow time provides flow time 505 with a next item of the position information 504 of the first communication information table 400, and stores the calculated flow time ("1 minute") in the flow time 505. The calculation part 205 calculates and stores the flow time 505 concerned with all position information 504 in one unit ID 402 ("AAA"), so that it is possible to calculate all flow time of the user's flow line in the area of the unit ID 402 ("AAA"). In addition, the final radio wave intensity and final reception time in one unit ID 402 ("AAA") means information that the user goes out the area of the Wi-Fi sensor 11 of the unit ID 402 ("AAA"), so that the flow time corresponding to the final radio wave intensity and final reception time does not exist. The calculation part 205 calculates the flow line and the flow time of each unit ID 402, so that it is possible to calculate user's action information in the area of the Wi-Fi sensor 11 of each unit ID 402.

When the calculation part 205 finishes the calculation of the unit ID, a estimation part 206 estimates user's action information indicating that the user did actually on the area of the Wi-Fi sensor 11 of the unit ID based on the part of the flow line and the flow time calculated (FIG. 3, S106).

Figure 6:
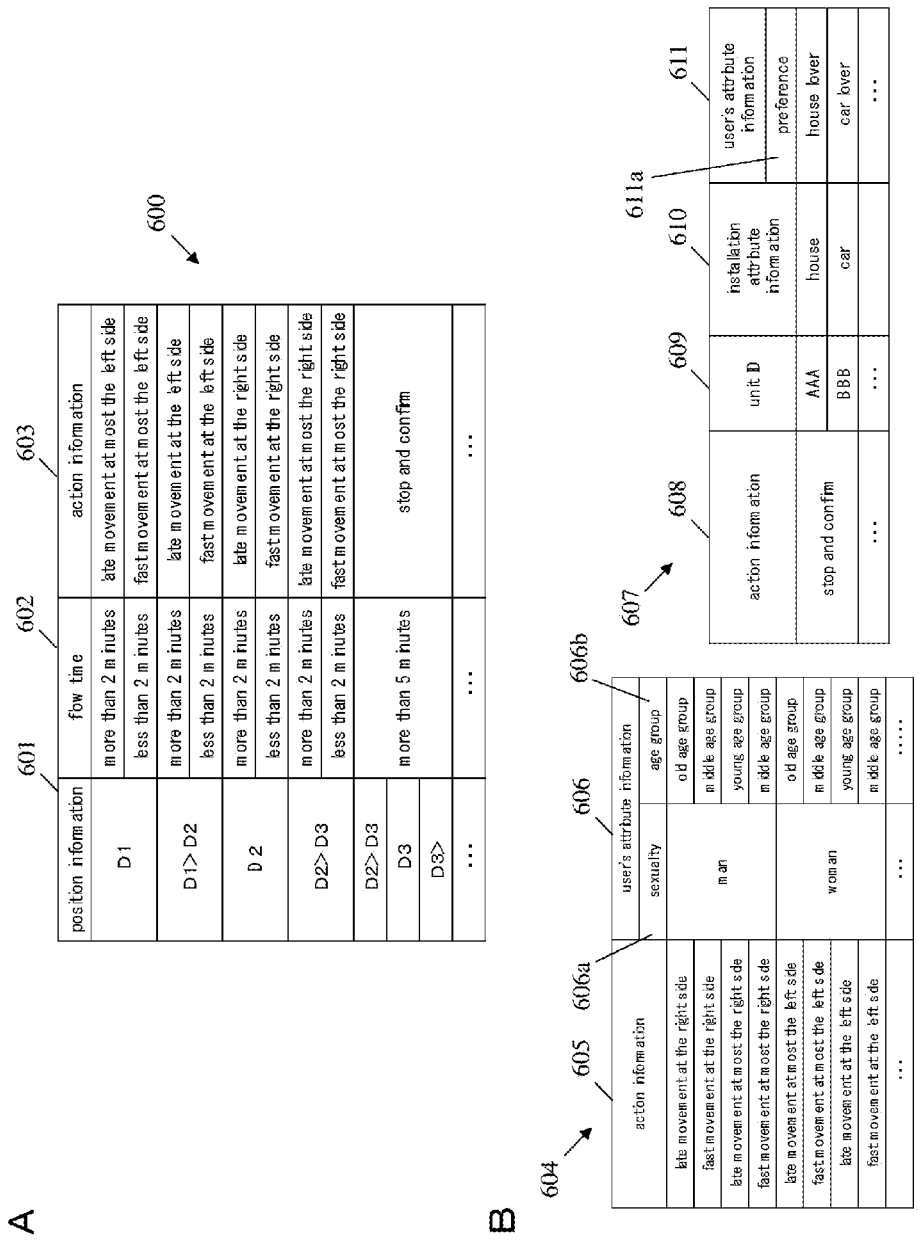
FIG. 6A is a view indicating an example of a first action information table according to the invention.
FIG. 6B is a view indicating an example of first and second user's attribute information tables according to the invention.

For example, the estimation part 206 defines the user's action information based on a kind of the position information 504 and the length of the flow time 505. Namely, the estimation part 206 refers to a first action information table pre-stored in a specific memory. As shown in FIG. 6A, the first action information table 600 includes position information 601 indicating the part of the flow line, flow time 602 in the position information 601, and user's action information 603 estimated from the position information 601 and the flow time 602. For example, the action information "late movement at the most left side" is stored in the position information "D1" and the flow time "more than 2 minutes", the action information "fast movement at the most left side" is stored in the position information "D1" and the flow time "less than 2 minutes", and the action information "stop and confirm" is stored in the position information "D2>D3" and the flow time "more than 5 minutes". In addition, the action information is set appropriately based on the installed position of the Wi-Fi sensor 11. The estimation part 206 collates the calculated position information 504 and the calculated flow time 505 with the position information 601 and the flow time 602 in the first action information table 600, and acquires the action information 603 corresponding to the position information 601 and the flow time 602 collating. Therefore it is possible to roughly estimate the concrete action that the user did actually.

When the estimation part 206 finishes the estimation of the part of the flow line and the flow time, an analysis part 207 analyzes the user's attribute information including the user's preference based on the estimated user's action information and the installation attribute information indicating the attribute of the installation of the Wi-Fi sensor, the installation attribute information pre-provided to the unit ID (FIG. 3, S107).

For example, the analysis part 207 defines the user's attribute information based on a kind of the user's action information. For example, the analysis part 207 refers to a first user's attribute information table pre-stored in a specific memory. As shown in FIG. 6B, the first user's attribute information table 604 includes the action information 605 and the user's attribute information 606 analyzed by the action information 605. Here, user's sexuality 606a and age group 606b are stored in the user's attribute information 606. For example, generally the man keeps to the right and the woman keeps to the left, so that the user's attribute information "man" is stored in the action information "late movement at the right side" and the user's attribute information "woman" is stored in the action information "late movement at the most left side". The traffic position of the passage corresponds to the age group, generally young age group passes on the center of the passage, and old age group passes on the edge side of the passage. Therefore the user's attribute information "old age group" is stored in the action information "late movement at the most left side", and the user's attribute information "young age group" is stored in the action information "late movement at the left side". Generally the middle age group passes fast, and the user's attribute information "middle age group" is stored in the action information "fast movement at the most left side". The analysis part 207 collates the estimated action information with the action information 605 of the first user's attribute information table 604, and acquires the user's attribute information 606 (sexuality 606a and age group 606b) corresponding to the action information 605 collating. Therefore it is possible to roughly estimate user's sexuality and age group from the concrete action of the user.

The analysis part 207 refers to a second user's attribute information table pre-stored in a specific memory. As shown in FIG. 6B, the second user's attribute information table 607 includes the action information 608, unit ID 609 corresponding to the action information 608, installation attribute information 610 corresponding to the unit ID 609, and user's attribute information 611 analyzed from the action information 608 and the installation attribute information 610. Here, user's preference 611a is stored in the user's attribute information 611. For example, the user's attribute information "car lover" is stored in the combination with the action information "stop and confirm" and the installation attribute information "car". The analysis part 207 collates the estimated action information and the unit ID with the action information 608 and the unit ID 609 in the second user's attribute information table 607, and acquires the user's attribute information 611 (user's preference 611a) corresponding to the action information 608 and the unit ID 609 collating. Therefore by associating a category (installation attribute information) of the product (digital signage, goods in shop, or the like) to which the user accesses with the user's action information, and it is possible to analyze the user's attribute information including user's preference concretely.

Specifically, the present invention with the terminal ID is not necessary to acquire the concrete personal information of the user from the user terminal 10, is not necessary to perform registration of the user ID beforehand by the user, and it is possible to easily carry out without contacting the personal information in marketing system 1. And the wireless unit 11 is effective in building or shop, and it is possible to concretely estimate and analyze users action history and user's preference that the conventional marketing system has not been able to catch. The communication speed of the wireless unit 11 is fast, and the range of radio wave reception of the wireless unit 11 is a relatively wide range, so that it is possible to easily analyze the user's preference by grasping the chronological change of the radio wave intensity.

When the analysis part 207 finishes the analysis of the user's attribute information, a notice part 208 identifies relevant information concerned with the user of the user's attribute information based on the analyzed user's attribute information (target), and displays notice information in the identified relevant information to an electronic equipment (e.g., digital signage 14) or the user terminal 10 through the network 12, the electronic equipment or the user terminal 10 located near other Wi-Fi sensor 11 of the area where the user terminal 10 exists (FIG. 3, S108).

Figure 7:
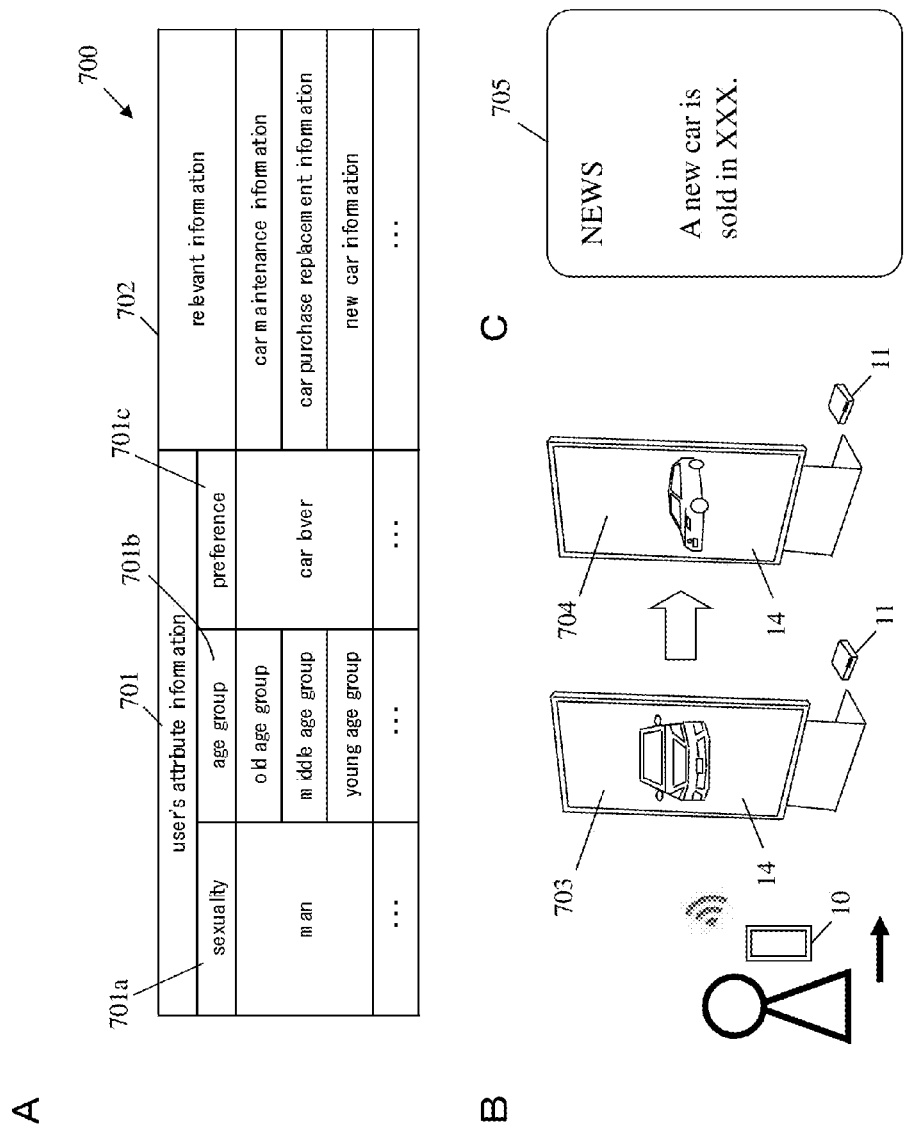
FIG. 7A is a view indicating an example of a first relevant information table according to the invention.
FIG. 7B is a view indicating an example of a display switching of a digital signage according to the invention.
FIG. 7C is a view indicating an example of a notice information of a user terminal.

For example, the notice part 208 refers to a first relevant information table pre-stored in a specific memory. As shown in FIG. 7A, the first relevant information table 700 includes user's attribute information combined with sexuality 701a, age group 701b, and preference 701c, and relevant information 702 thought that the user of the user's attribute information shows interest. For example, the relevant information "car purchase replacement information" is stored in the user's attribute information of the sexuality "man", the age group "middle age group", and the preference "car lover. The relevant information new car information" is stored in the user's attribute information of the sexuality "man", the age group "young age group", and the preference "car lover". The notice part 208 collates the user's attribute information of the sexuality, the age group, and the preference with the user's attribute information 701 of the first relevant information table 700, and acquires the relevant information 702 corresponding to the user's attribute information 701 collating. And the notice part 208 refers to database pre-registered, and acquires news information or advertisement information concerned with the acquiring relevant information 702 from the referring database as notice information. The notice information includes renewal information, coupon information, or declaration information in product, service, area, and shop.

When the server 13 can acquire information from database of the other terminal through the network 12, for example, the notice part 208 keyword-searches the relevant information 702 acquiring, and searches and acquires news information or advertisement information concerned with the relevant information 702 from database on the server 13 or the other server.

When the notice part 208 acquires the notice information, the notice part 208 notifies the notice information to the digital signage 14 linking the Wi-Fi sensor 11 of the area where the user terminal 10 through the network 12. For example, when the user passed through the second Wi-Fi sensor 11 goes in the range of radio wave reception of the third Wi-Fi sensor 11, similarly, the user terminal performs short-distance wireless communication to the third Wi-Fi sensor 11 newly. The communication information is transmitted to the collection part 204 through the third Wi-Fi sensor 11. Therefore the notice part 208 notifies the notice information to the third digital signage 14 near the third Wi-Fi sensor 11 through the control terminal 15 controlling the display of the digital signage based on the communication information. As shown in FIG. 7B, the video display part 209 of the third digital signage 14 displays the video 703 (screen) corresponding to the notice information. Therefore it is possible to display the notice information analyzed by the user's past action history (off-line action history) with matching the user's online action, and to realize an effective advertisement.

Conventionally, a digital signage installed in a specific area such as a station, an exhibition, a sidewalk, or the like displays pre-set video or screen uniformly, so that it is not in novelty for a user. In the present invention, it is possible to display video or screen matching user's preference analyzed by the user's past action history, and to provide information to the user with the impact.

If the marketing system uses user's attribute information analyzed by the user's past action history to a display part of the other wireless unit (video display part of the digital signage, display part of the user terminal) that the user contacts next, it is possible to realize the optimization of contents of distribution, day of distribution, time of distribution, location of digital signage, or the like, and to optimize added value up of content distribution, and advertisement price. And by linking DSP (Demand-Side Platform) of user's attribute information analyzed by off-line action history to DMP (Data Management Platform) of notice information selected by a specific user's attribute information, it is possible to realize user's comprehensive enclosure (inducement) with high accuracy.

The transmission (video distribution) of the notice information by the control terminal 15 is usually using STB (Set Top Box) converting broadcast signal into general video signal. Therefore to smoothly link the server 13 to the control terminal 15, CMS (Content Management System) for managing digital content distribution constituting web content such as text, image, or the like, is built, and ASP (Application Service Provider) may provide service of the digital content form the server 13 to the control terminal 15 through the network 12.

The third Wi-Fi sensor 11 is provided to the third digital signage 14, so that the video display part 209 may change the video 703 corresponding to the notice information into the other video 704 depending on proximity of the user (user terminal 10) to the third digital signage 14 (third Wi-Fi sensor 11). Therefore it is possible to enhance user's interest in video more.

The notice part 208 may display the notice information to the user terminal 10 of the terminal ID directly based on the terminal ID of the communication information. For example, when the notice part 208 notifies the notice information to the user terminal 10 through the network 12, the display part 210 of the user terminal 10 displays the notice information. As shown in FIG. 7B, the displayed notice information (screen) is news information 705 (advertisement) of new car. Therefore it is possible to effectively notify the notice information depending on the user's preference, and to provide information with a high customer buying intention effect and a high customer collection effect. For example, the display of the notice information by the display part 210 is executed by an exclusive application pre-installed in the user terminal 10 or an exclusive application incorporated to the application pre-installed in SDK (Software Development Kit).

The notice part 208 displays the notice information being hard to display (tell) at video to the display part 210 of the user terminal 10 by corresponding to the display of the video (screen) in the above-mentioned digital signage 14. Therefore it is possible to provide detailed information.

The notice part 208 may translate the notice information corresponding to language led by user's attribute information (e.g., language identified by installation attribute information of the Wi-Fi sensor 11), or language pre-set to the user terminal 10, and notify the translated notice information. Therefore for example, when the user went to various countries for a trip as a tourist, it is possible to surely confirm the notice information by user language in the area of the marketing system 1.

The display of the notice information by the display part 210 of the user terminal may be limited to only user terminal 10 pre-installing the exclusive application by the good balance with the privacy policy, for example.

By the way, the above-mentioned notice information can be distinguished each terminal ID, so that the analysis part 207 of the server 13 may calculate the number of the terminal ID concerned with to the radio wave intensity (e.g., "Near", "Immediate") of a specific unit ID indicating that the user approached the Wi-Fi sensor 11 of the unit ID, and analyze the number of the terminal ID each unit ID as user's interest concerned with installation attribute information of the unit ID. For example, if the screen of the first digital signage 14 is more attractive for a user than the screen of the second digital signage 14, the number of the user terminal 10 accessing to the first Wi-Fi sensor 11 of the first digital signage 14 becomes more than the number of the user terminal 10 accessing to the second Wi-Fi sensor 11 of the second digital signage 14. Therefore by roughly estimating the number of the accessing user who was not able to analyze in conventional digital signage, it is possible to visually calculate the customer collection effect of the screen (content) every digital signage 14. And by combining the user's attribute information of the accessing user terminal 10, it is possible to analyze and grasp the users of what kind of attribute are easy to gather for a screen of each digital signage 14. Although the user's attribute information includes sexuality, the age group, and the preference, the user's attribute information may be sexuality, or the age group only.

Figure 8:
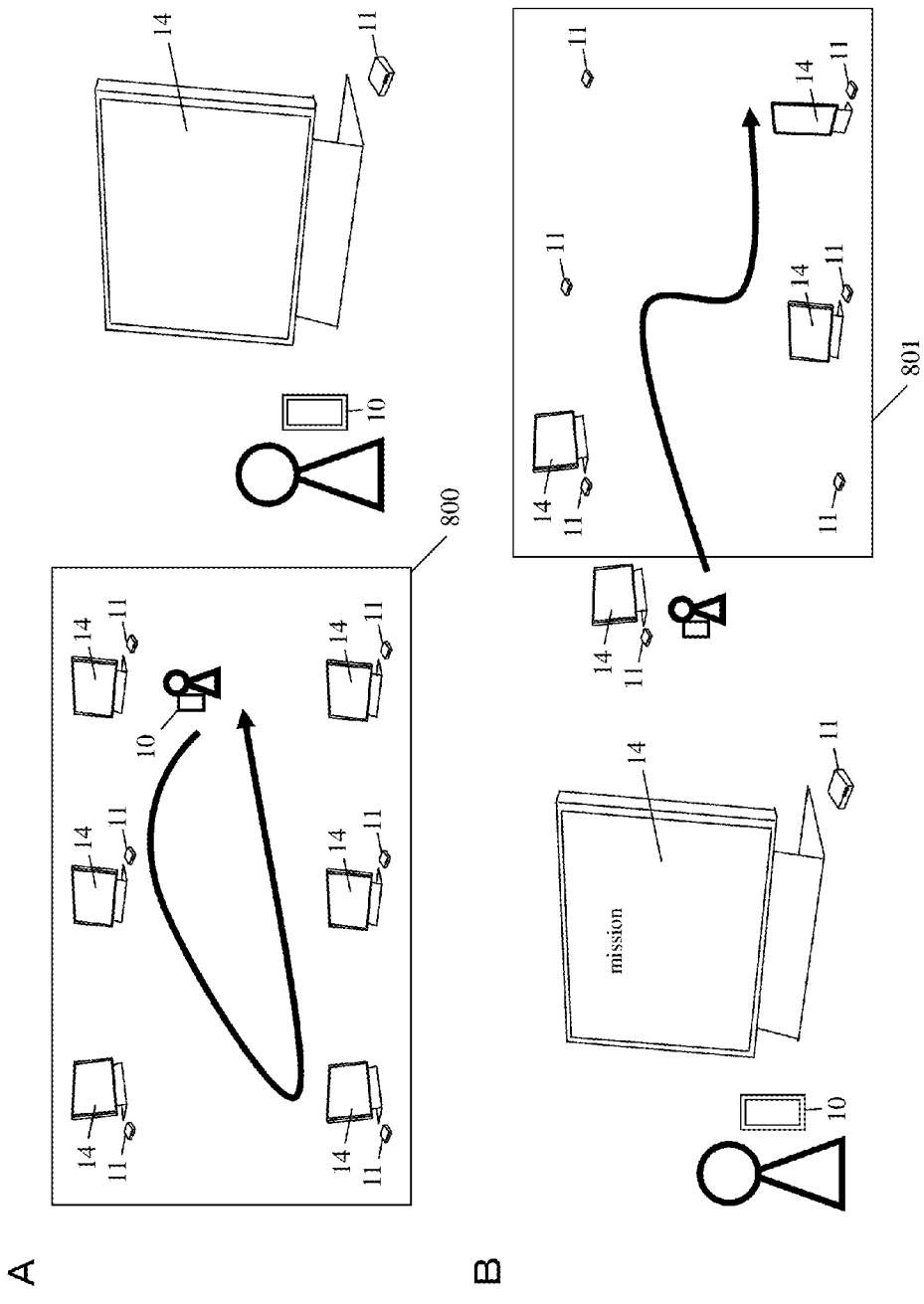
FIG. 8A is a view indicating a first application example of a marketing system according to the invention.
FIG. 8B is a view indicating a second application example of a marketing system according to the invention.

By the way, the above-mentioned marketing system 1 can be applied to the digital signage 14 of an exhibition. For example, as shown in FIG. 8A, the digital signage 14 and the Wi-Fi sensor 11 are installed in each booth of the exhibition 800. The screen (installation attribute information) of the digital signage 14 is pre-related with the unit ID of the Wi-Fi sensor 11. When a user coming for the exhibition 800 reads the digital signage 14 the predetermined number with the user terminal 10, the analysis part 207 analyzes the digital signage 14 read by the user as user's attribute information. When the user accesses to a specific digital signage 14 (Wi-Fi sensor 11), the notice part 208 identifies a screen of the other digital signage 14 not read by user as relevant information based on the user's action information and the user's attribute information, and notifies the screen of the other digital signage 14 as notice information to the specific digital signage 14 accessed by the user now. Therefore it is possible to timely display the screen of the specific digital signage 14 not read to the user.

The above-mentioned marketing system 1 can be applied to a play with a digital signage 14. For example, as shown in FIG. 8B, the digital signage 14 and the Wi-Fi sensor 11 are installed in the entrance of a specific hall 801, and plural Wi-Fi sensors 11 (or/and digital signage 14) are installed in each position in the hall 801. When a user having a user terminal 10 accesses to the digital signage 14 (Wi-Fi sensor 11) of the entrance, the analysis part 207 analyzes the user's attribute information including the user's sexuality, and the notice part 208 notifies a different screen depending on the user's attribute information to the digital signage 14. The screen is a mission video for the user, and the user seeing the mission video downloads application indicated at QR Cord® of the mission video to the user terminal 10. When the user discovers (accesses) a specific Wi-Fi sensor 11 in the hall 801 with using the application, the mission is completed. The specific Wi-Fi sensor is identified by the installation attribute information. Ranking may display by measuring time form a mission start to mission completion (discovery) every user terminal 10.

By the way, there are explained when the wireless unit 11 is a Beacon terminal. In this case, the action effects which are similar to the above can be also obtained. First, as shown in FIG. 1, FIG. 2, a second communication part 202 of a Beacon terminal 11 installed in a specific area sends radio wave including the unit ID of the Beacon terminal 11 regularly (FIG. 3, S101).

When the user owning the user terminal 10 enters in the area, a first communication part 201 of the user terminal 10 receives the sent radio wave (FIG. 3, S102), and the first communication part 201 of the user terminal 10 performs short-distance wireless communication (BLE communication) to the second communication part 202 of the Beacon terminal 11.

When the first communication part 201 of the user terminal 10 receives the radio wave, a transmission part 203 of the user terminal 10 transmits communication information including the terminal ID of the user terminal 10, the unit ID of the Beacon terminal 11, and radio wave intensity (RSSI) to the server 13 through the network 12 (FIG. 3, S103).

For example, the communication between the user terminal 10 and the server 13 can include communication by LTE (Long Term Evolution), communication via 3G (3rd Generation) line, communication by wireless LAN, or the like. The LTE is the communication standard of the third generation mobile communication system standardized in 3GPP (3rd Generation Partnership Project), and the 3G line is a generic name of the third generation cell-phone method.

The transmission part 203 acquires the unit ID (e.g., MAC address, "AAA") included in the received radio wave and the radio wave intensity (e.g., "Far"). Next, the transmission part 203 acquires the terminal ID ("aaa") pre-stored in a specific memory of the user terminal 10, and transmits communication information including these to the server 13 through the network 12.

When the wireless unit 11 is a Beacon terminal 11, the user terminal 10 provides the transmission part 203, so that the wireless unit 11 may provide only second communication part 202. In other words, complicated function or wiring is not necessary to the wireless unit 11. The consumption electricity required for the second communication part 202 sending radio wave regularly is less than the other parts by BLE communication. For example, it is possible to continue sending of radio wave form the second communication part 202 of the wireless unit 11 for several years with only a dry cell. And it is possible to substitute the first communication part 201, the transmission part 203, and display part 208 by parts pre-provided to the user terminal 10, or executing of the application. Therefore when the wireless unit 11 is a Beacon terminal 11, it is possible to easily execute the marketing system of the present invention more. The processing of the later S104-S108 is similar to the above, so that the processing is omitted.

Figure 9:
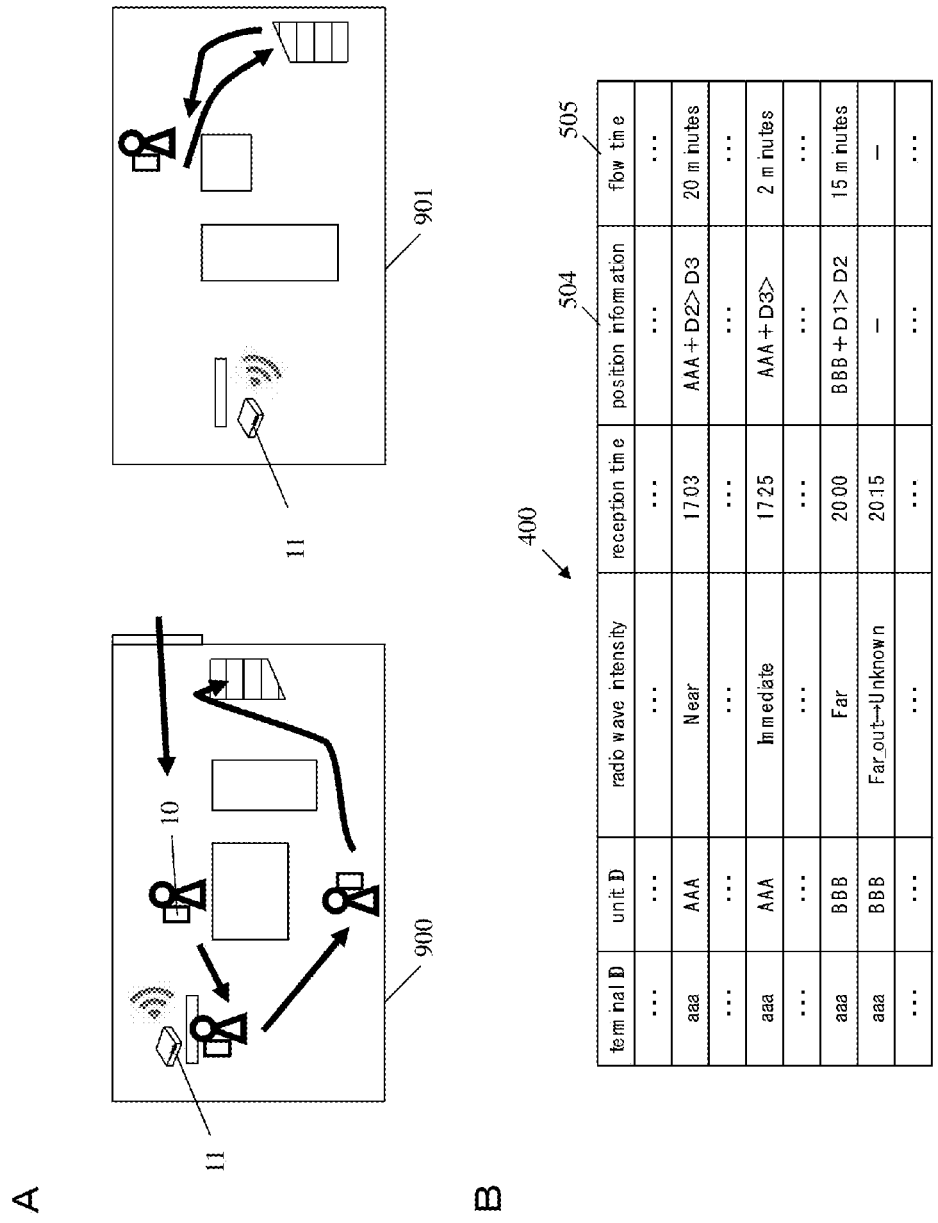
FIG. 9A is a view indicating an example of the position relationship between a wireless unit and a user terminal in a shop according to the invention.
FIG. 9B is a view indicating an example of a calculation of a user's flow line and a flow time in a second communication information table.

By the way, the above mention is explained the marketing system 1 combining the wireless unit 11 with the digital signage 14, and the digital signage 14 may not be necessary. For example, the wireless unit 11 may be installed near sales floor of products in the shop. One user's attribute information may be analyzed based on plural action histories estimated by plural unit ID, and plural installation attribute information of plural unit ID. For example, as shown in FIG. 9A, each beacon terminal is installed in an area of each sales floor of a specific shop (e.g., a department store). The second communication part 202 of the Beacon terminal 11 sends radio wave regularly (FIG. 3, S101). When a user with the user terminal 10 goes in a first sales floor 900, the first communication part 201 of the user terminal 10 receives the radio wave of the second communication part 202 of the first Beacon terminal 11 (FIG. 3, S102), and the transmission part 203 of the user terminal 10 transmits communication information including the terminal ID of the user terminal, the unit ID of the Beacon terminal and radio wave intensity to the server 13 through the network 12 (FIG. 3, S103). The collection part 204 collects a chronological change of the radio wave intensity in the terminal ID of the communication information concerned with the unit ID ("AAA") of the received communication information (FIG. 3, S104).

Here, the user goes in the first sales floor 900, moves to a shop shelf of products (e.g., a plastic model) where the radio wave intensity of the first Beacon terminal 11 is "Near", selects a specific product, and goes to the cash register. As shown in FIG. 9B, the collection part 204 stores the reception time "17:03" corresponding to the radio wave intensity "Near" in a second communication information table 400, and stores the reception time "17:25" corresponding to the radio wave intensity "Immediate" in the second communication information table 400 depending on changing of the radio wave intensity in the unit ID ("AAA") of the first Beacon terminal 11.

The user who went to the cash register purchases the products, leaves the first sales floor 900, as shown in FIG. 9A, goes in the second sales floor 901, views a product (e.g., a high-resolution camera) of a shop shelf where the radio wave intensity of the second Beacon terminal 11 is "Far", and leaves the second sales floor 901. As shown in FIG. 9B, the collection part 204 stores the reception time "20:00" corresponding to the radio wave intensity "Far" in the second communication information table 400, and stores the reception time "20:15" corresponding to the radio wave intensity "Far_out→Unknown" in the second communication information table 400 depending on changing of the radio wave intensity in the unit ID ("BBB") of the second Beacon terminal 11.

And the calculation part 205 calculates a part of the flow line of the user and the flow time based on the chronological change of the collected radio wave intensity (FIG. 3, S105), and as shown in FIG. 9B, stores the part of the flow line (position information) 504 (e.g., "AAA+D2>D3") and the flow time 505 (e.g., "20 minutes") calculated in the second communication information table 400.

Figure 10:
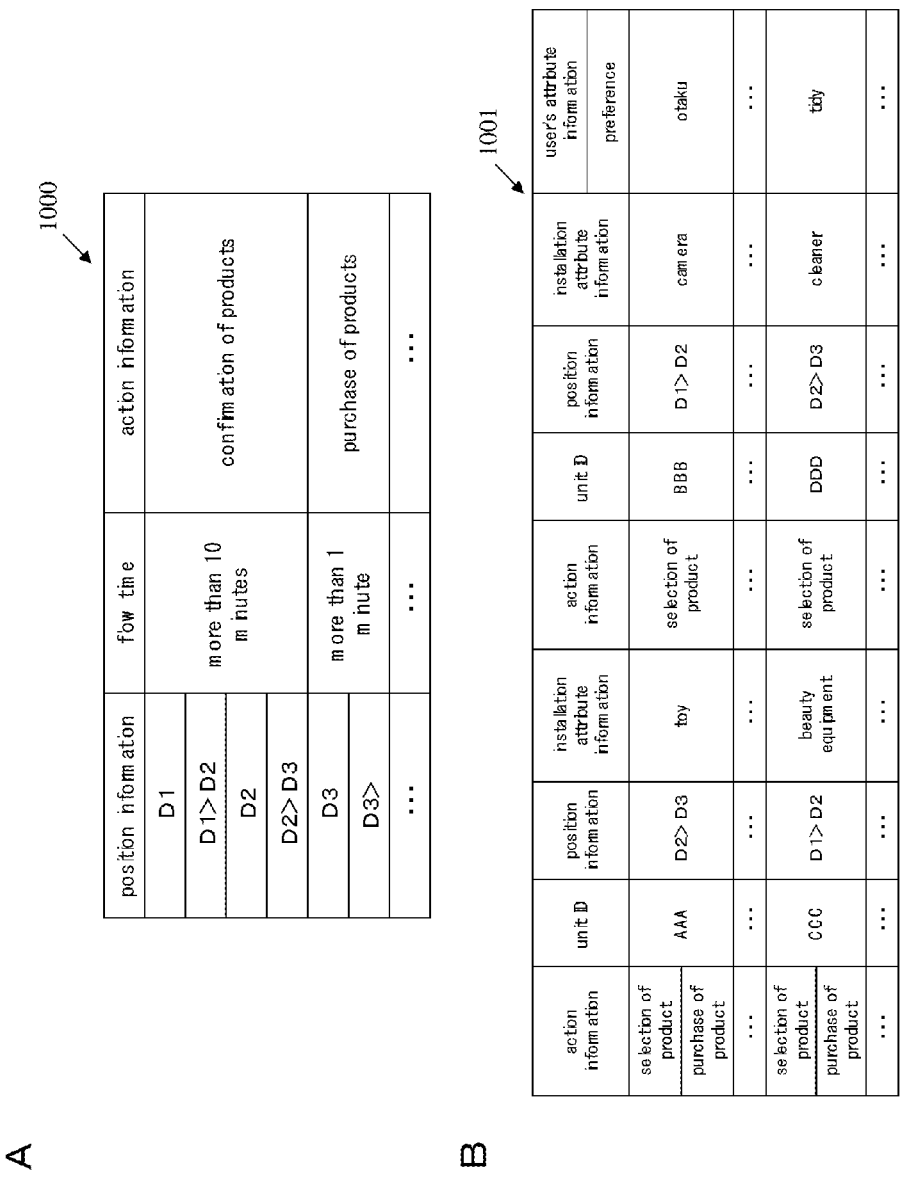
FIG. 10A is a view indicating an example of a second action information table according to the invention.
FIG. 10B is a view indicating an example of third user's attribute information table according to the invention.

As shown in FIG. 10A, a second action information table 1000 stores action information "confirmation (reading) of products" in position information "D1>D2" and flow time "10 minutes or more", and stores action information "purchase of products" in a position information "D3>" and flow time "1 minute or more". The estimation part 206 refers to the second action information table 1000, and estimates user's action information based on the part of the flow line of the user and the flow time calculated (FIG. 3, S106). Particularly, by estimating a concrete action (purchase) that the user did actually from the part of the flow line of the user and the flow time, for example, the cooperation with POS (Point of Sale) is not necessary.

As shown in FIG. 10B, a third user's attribute information table 1001 stores installation attribute information "toy" in position information "D2>D3" and unit ID "AAA" corresponding to action information "selection of product" and "purchase of product", and stores installation attribute information "camera" in position information "D1>D2" and unit ID "BBB" corresponding to action information "selection of product". Here, the analysis part 207 cannot analyze what a user purchases as a product with action information "purchase of product", so that the analysis part 207 analyzes a shop shelf (installation attribute information) where the user selects the product with using action information "selection of product", unit ID and position information close to "purchase of product". When action information "purchase of product" exists in a specific unit ID, it may be analyzes that the user purchased all products corresponding to action information "selection of product" in the unit ID. And user's attribute information "otaku" is stored in response to two installation attribute information ("toy", "camera"). This "otaku" means the fan of a sub-culture or a toy such as an animation, a personal computer, or the like. For example, when a user purchases a plastic model, and sees around a camera, the user is analyzed as "otaku".

An installation attribute information "beauty equipment" is stored in position information "D1>D2" and unit ID "CCC" corresponding to action information "selection of product" and "purchase of product", and an installation attribute information "cleaner" is stored in position information "D2>D3" and unit ID "DDD" corresponding to action information "selection of product". And user's attribute information "tidy" is stored in response to two installation attribute information ("beauty equipment", "cleaner"). This "tidy" means the person being interested in beauty and cleaning. For example, when a user purchases a beauty skin steamer, and sees around a vacuum cleaner, the user is analyzed as "tidy". Therefore it is possible to accurately analyze user's preference by considering plural concrete action information and plural installation attribute information of unit ID.

Figure 11:
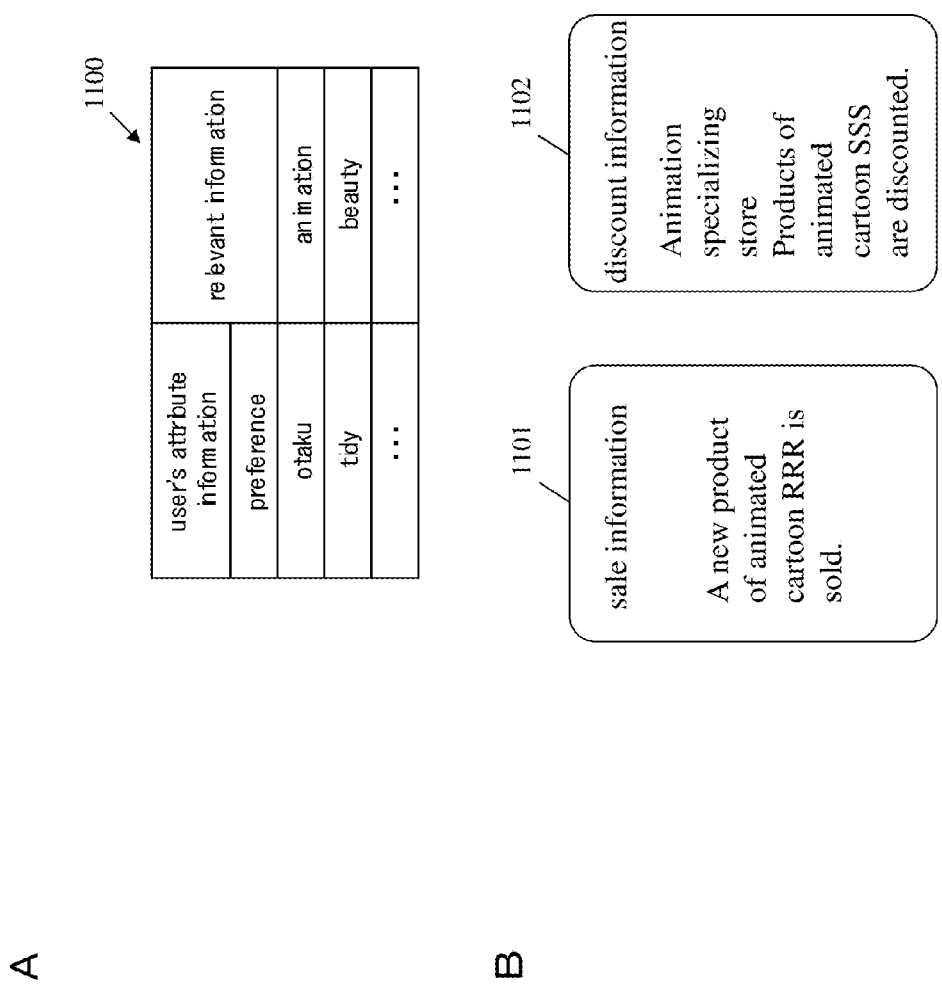
FIG. 11A is a view indicating an example of a second relevant information table according to the invention.
FIG. 11B is a view indicating an example of a notice information of a user terminal according to the invention.

As shown in FIG. 11A, a second relevant information table 1100 stores relevant information "animation" in the user's attribute information "otaku", and stores relevant information "beauty" in the user's attribute information "tidy". The notice part 208 identifies relevant information (e.g., "animation") concerned with the user's attribute information analyzed with using the second relevant information table 1100, and displays notice information in the identified relevant information to the user terminal 10 through the network 12 (FIG. 3, S108).

The timing when the notice part 208 notifies is not particularly limited. For example, when the user reads a specific website with using the display part 210 of the user terminal 10, the notice part 208 detects reading of the specific website, and transmits the notice information to the user terminal 10. The notice part 208 of the user terminal 10 displays the notice information on the specific website. For example, as shown in FIG. 11B, the displaying notice information (screen) is sale information 1101 of a specific animated new product, or discount information 1102 (advertisement) of a specific animated product in an animation specializing shop in response to "animation". Therefore it is possible to effectively notify the notice information depending on user's preference (taste), and to provide information with a high customer buying intention effect and a high customer collection effect.

For example, when the user of "otaku" enters in the first sales floor 900 again, the notice part 208 detects the communication information including the terminal ID ("aaa") from the collection part 204 through the first Beacon terminal 11. Next the notice part 208 identifies notified party information (e.g., e-mail address, phone number) of the user terminal 10 with the terminal ID ("aaa"), converts the notice information into transmittable electronic data (e.g., an E-mail, c-mail) corresponding to the notified party information of the identified user terminal 10. And the notice part 208 transmits the converting electronic data to the user terminal 10 of the notified party information. The display part 210 of the user terminal 10 receiving the electronic data displays notice information corresponding to the electronic data. Therefore it is possible to push the notice information to the user coming to the shop again in real time, and provide information having higher effect. It is possible to effectively utilize user's attribute information analyzed by the off-line action history of the user.

For example, when the user of "otaku" goes to a sales floor concerned with "animation", the notice part 208 detects the communication information including the terminal ID ("aaa") through a Beacon terminal 11 installed in the sales floor, and notifies the notice information to the user terminal 10 of the user. Therefore it is possible to provide the optimum notice information met to user's preference depending on the user's real action in the sales floor.

The analysis part 207 may adopt the other analysis methods. For example, the analysis part 207 extracts operation information indicating the operation that a user did actually on the network 12 with the user terminal 10 based on the unit ID ("aaa"). For example, the operation information includes reading history (e.g., HP of animation "KKK") of website on the network 12, and downloading history (e.g., game application of animation "KKK"). And the analysis part 207 analyzes the user's attribute information based on the extracted operation information, the user's action history and the installation attribute information.

For example, the analysis part 207 extracts a keyword (e.g., animation "KKK") common to a part or all of the operation information from the operation information, and acquires user's attribute information "otaku" form the third user's attribute information table 1001. The analysis part 207 limits the user's attribute information to the field of the keyword by combining the extracted keyword (animation "KKK") with the user's attribute information ("otaku").

When the user of "tidy" reads the website of the article of the beauty equipment with the user terminal 10 of the self, the analysis part 207 extracts the common keyword ("beauty equipment") form the reading history (HP of the beauty equipment), and limits the "tidy" to the field of the extracted keyword ("beauty equipment").

Therefore it is possible to analyze user's attribute information in detail in consideration of the user's real action information, and the operation information (history information) on the network 12. The notice part 208 notifies specific notice information (the latest advertisement of animated cartoon "KKK") in response to the relevant information of the user's attribute information "otaku" limited to the field (animation "KKK") of this keyword. Therefore it is possible to effectively provide information with the most purchasing intention of the user.

The analysis part 207 may extract user setting information pre-set to the user terminal 10 of the terminal ID, and analyze user's attribute information with using the extracted user setting information. For example, the user setting information includes information that the user inputs by oneself such as sexuality, age, location, nationality, or the like. The analysis part 207 may extract shop attribute information of shop of area where the wireless unit 11 is installed based on the unit ID of the wireless unit 11, and analyze user's attribute information with using the extracted shop attribute information. The shop attribute information includes classification of the shop, the kind of the shop, the number of products, product property, service property, or the like.

The embodiment of the invention is the constitution distinguished the case when the wireless unit is a Wi-Fi sensor form the case when the wireless unit is a Beacon terminal, but the embodiment may be the other constitution. For example, the wireless unit being switchable between a Wi-Fi sensor and a Beacon terminal exists, so that it is possible to carry out the processing in the Wi-Fi sensor and the processing in the Beacon terminal with same wireless unit by using the switchable wireless unit.

As mentioned above, one wireless unit 11 is installed in one sales floor, for example, each wireless unit 11 may be installed in each shop shelf of one sales floor respectively. Therefore it is possible to estimate user's action position in detail, and to easily obtain the flow line information of the user. The Wi-Fi sensor and the Beacon terminal are combined and installed in one sales floor. For example, the Wi-Fi sensor having the transmission part 203 may be installed near the cash register in one sales floor, and the cheap Beacon terminal may be installed in each shop shelf in one sales floor respectively. It is possible to surely catch the user's product purchase by the Wi-Fi sensor, and to detect the user's interest (interest, reading) to the product by the Beacon terminal.

Figure 12:
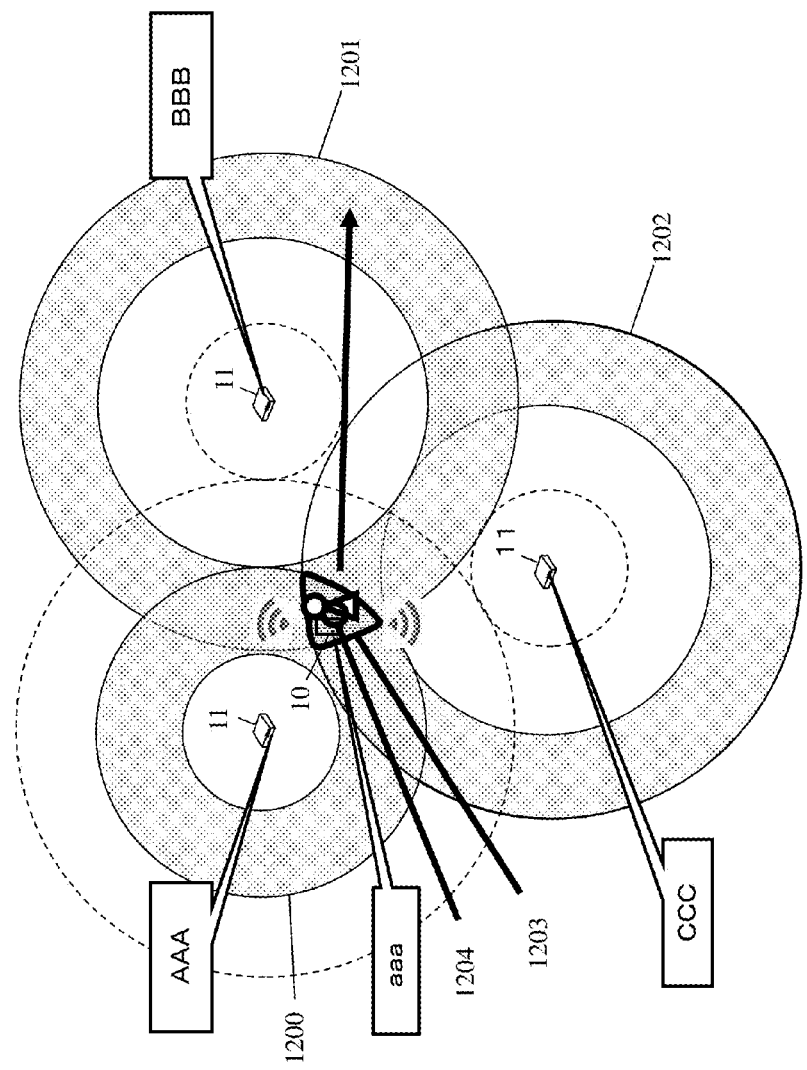
FIG. 12 is a view indicating an example of a calculation of a part of the user's flow line based on communication information of plural different wireless units.

When plural wireless units 11 are installed in each area to overlap a part of the range of radio wave reception of the plural different wireless units 11 mutually, and the communication information of the plural wireless units 11 are used, it is possible to calculate a part or all of the flow line of the user in detail. For example, as shown in FIG. 12, the range of radio wave reception "Far" of a specific wireless unit 11 overlaps the range of radio wave reception "Near" and "Far" of the other two different wireless units 11 respectively, and the range of radio wave reception "Near" of the wireless unit 11 overlaps the range of radio wave reception "Far" and "Far" of the other two different wireless units 11 respectively. In this case, when the user terminal 10 of the user enters in the overlapped range of radio wave reception, plural (three) communication information are obtained in response to the same terminal ID ("aaa") of user terminal 10 at the same (equal) reception time. For example, the plural communication information include the radio wave intensity "Near" of the unit ID "AAA", the radio wave intensity "Far" of the unit ID "BBB", and the radio wave intensity "Far" of the unit ID "CCC". The calculation part 205 draws plural rings 1200, 1201, 1202 of which a radius is the distance corresponding to the each radio wave intensity on the center of the wireless unit 11 of the each unit ID respectively virtually. The radius of the radio wave intensity "Near" is the distance "D2>D3", and the radius of the radio wave intensity "Far" is the distance "D1>D2". And the calculation part 205 calculates the center position 1204 of the overlap part 1203 of the drawing rings 1200, 1201, 1202 as a part (position information) of the user's flow line at a specific reception time. Therefore it is possible to identify a part of the user's flow line concretely.

When two different communication information exist at a specific reception time, the calculation part 205 can roughly calculate a part (position information) of the user's flow line by using a chronological change of the radio wave intensity of each unit ID. When more than three different communication information exist at a specific reception time, the overlap part of many drawing rings is limited to one place preferably.

When a part or all of the user's flow line is accurately calculated, it is easy to associate the user's action information. For example, by calculating that a part of the user's flow line exists near a specific digital signage 14 or a shop shelf, it is possible to identify concretely by distinguishing whether the user passes through only, or the user stops and confirms by the digital signage 14 or the shop shelf. Therefore it is possible to analyze user's attribute information in detail.

As mentioned above, a part (position information) of the user's flow line is displayed as a combination of the unit ID and the distance of the radio wave intensity, the other constitution may be adopted. For example, when the unit ID is pre-related with concrete position information (e.g., longitude and latitude, a GPS coordinate value, or the like) where the wireless unit 11 of the unit ID, it is possible to grasp the concrete position information (numerical value) of the user based on the position information of the unit ID and the distance of the radio wave intensity as a part of the user's flow line.

Figure 13:
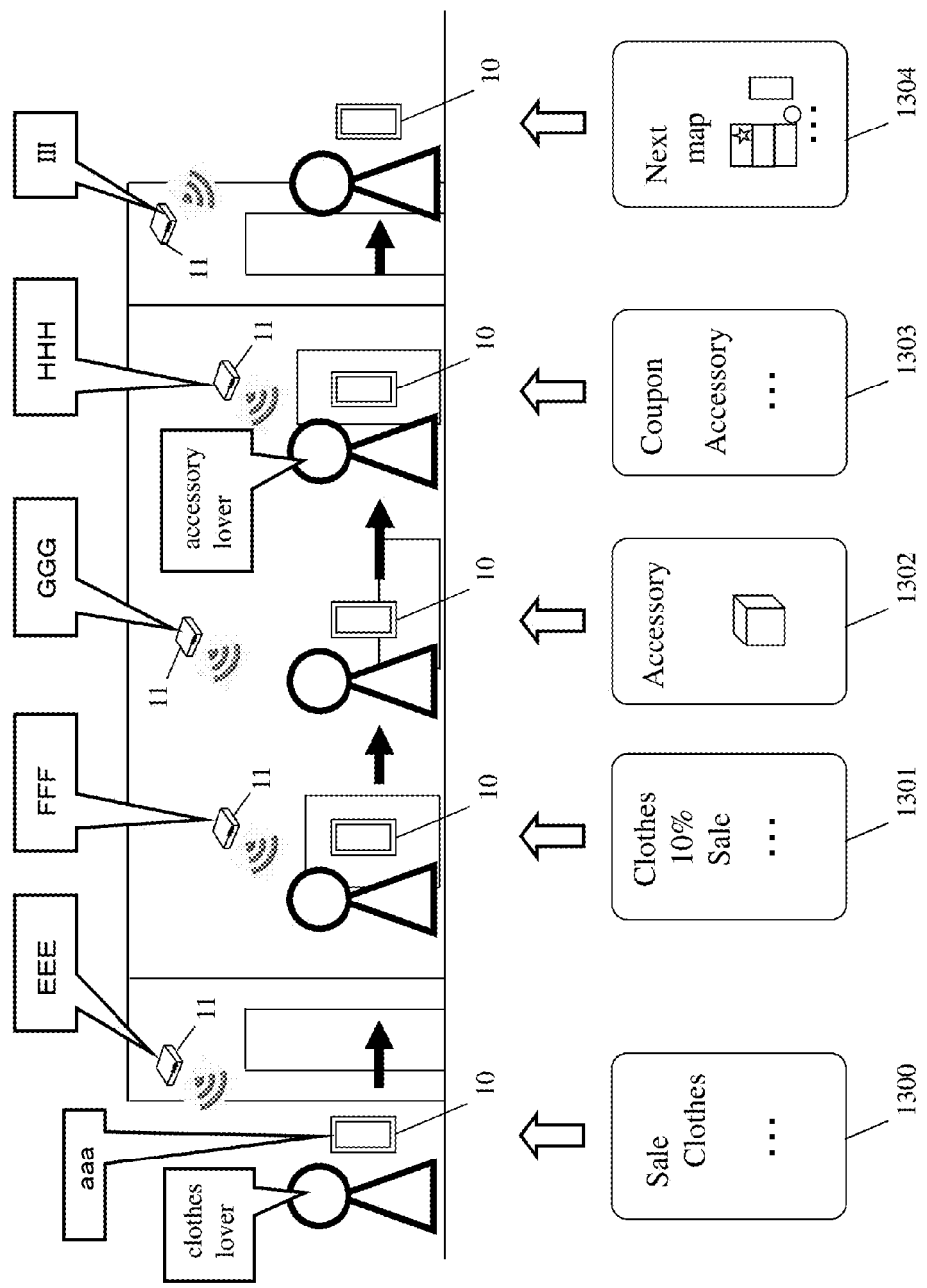
FIG. 13 is a view indicating an example when a marketing system according to the invention guides a user to a shop.

In addition, it is possible to guide a user to a shop based on already analyzed user's attribute information in the present invention. For example, as shown in FIG. 13, FIG. 14, when a user being a "clothes lover" in user's attribute information passes the front of the clothes shop entrance, the user terminal 10 of the terminal ID ("AAA") performs short-distance wireless communication to the wireless unit 11 of the unit ID ("FEE"), the wireless unit 11 installed in the clothes shop entrance, and the notice part 208 displays sales notice information 1300 of the clothes shop entrance related to the user's attribute information of the "clothes lover". When the user looking at the sales notice information enters in the clothes shop and approaches a clothes shelf, by the short-distance wireless communication to the wireless unit 11 of the unit ID ("FFF"), the wireless unit 11 installed in the clothes shelf, and the notice part 208 displays sales notice information 1301 of clothes 10% off to the user terminal 10. Therefore it is possible to guide the user to a shop and to promote the purchase of the product in the clothes shelf.

When the user passes through an accessory shelf, by the short-distance wireless communication to the wireless unit 11 of the unit ID ("GGG"), the wireless unit 11 installed in the accessory shelf, and the notice part 208 displays notice information 1302 indicating an introduction of the accessory to the user terminal 10. Here, when the user selects the product at the accessory shelf, the analysis part 207 newly adds "accessory lover" to "clothes lover" of the user's attribute information based on the user's action information ("selection of product") and the installation attribute information ("accessory shelf") of the unit ID ("GGG"). Thus, when the user approaches the cash register in the clothes shop, by the short-distance wireless communication to the wireless unit 11 of the unit ID ("HHH"), the wireless unit 11 installed in the cash register, the notice part 208 displays coupon notice information 1303 of the accessory related to the newly analyzed user's attribute information ("accessory lover") to the user terminal 10. In this way, the user's attribute information are updated at any time by using the user's action information obtained by a round-trip of the shop, or the like, and the optimum notice information met to user's action information at the moment is displayed.

And when the user passes through a clothes shop exit, by the short-distance wireless communication to the wireless unit 11 of the unit ID ("III"), the wireless unit 11 installed in the exit of the clothes shop, the notice part 208 displays map notice information 1304 of the next popular shop concerned with the user's attribute information ("accessory lover") to the user terminal 10. Therefore it is possible to guide and induce the user to a shop that the user may be interested in. The map notice information 1304 may be information concerned with the already analyzed user's attribute information ("clothes lover"). When the analysis part 207 newly analyzes the user's attribute information, the analysis part 207 may delete the old user attribute information ("clothes lover"). Here, as shown in FIG. 14, a part (position information) of the flow line of the user in the user terminal 10 of the specific terminal ID ("aaa"), the flow time, the user's action information, the installation attribute information, and the user's attribute information are collected to a shop visit table 1400 and used by the shop side to guide a future customer. It is an example of the round-trip of the shop of the user in FIG. 13, FIG. 14, but even a user's approach to a digital signage 14 is similar.

Figure 15:
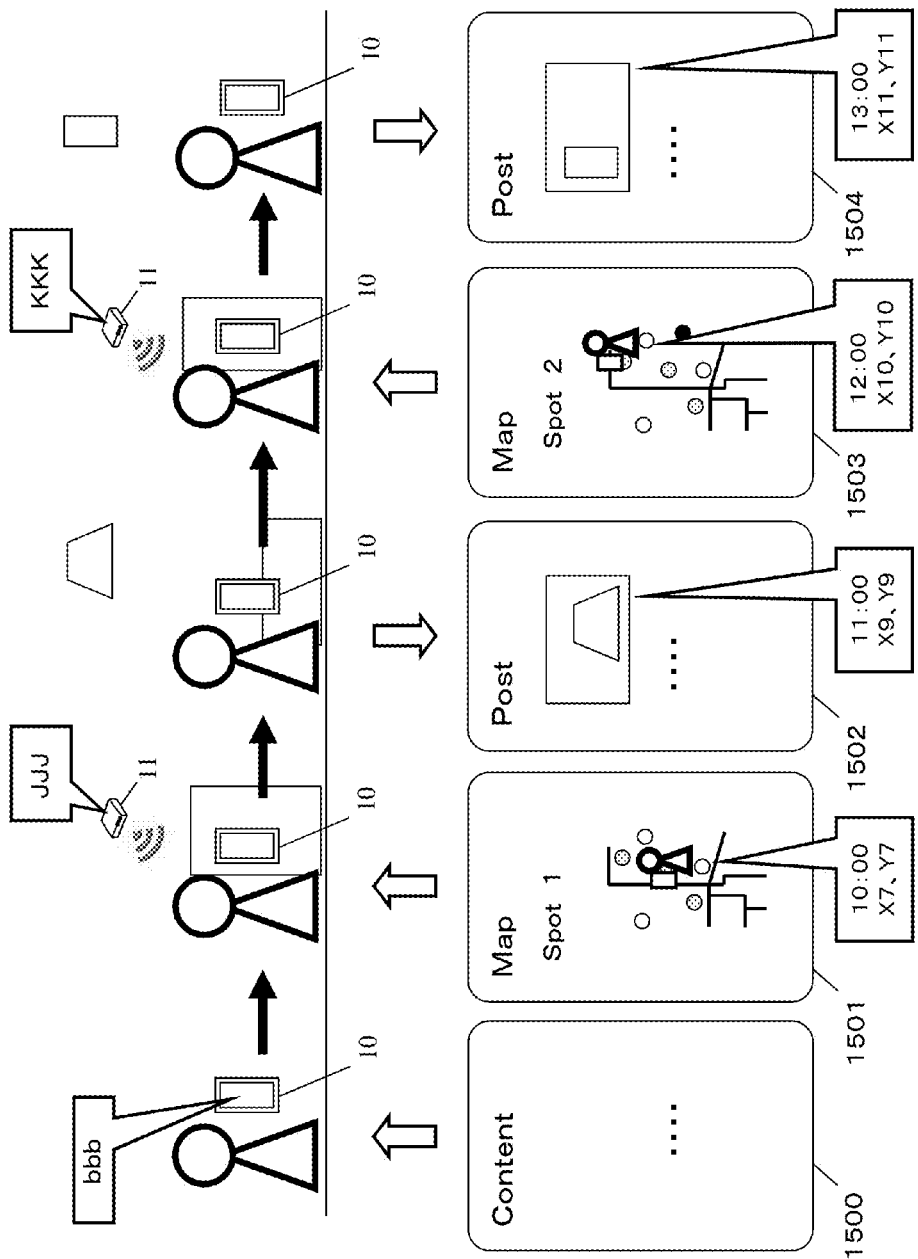
FIG. 15 is a view indicating an example of an analysis of user's action pattern over a large area by combining a marketing system according to the invention with other method.
Figure 16:
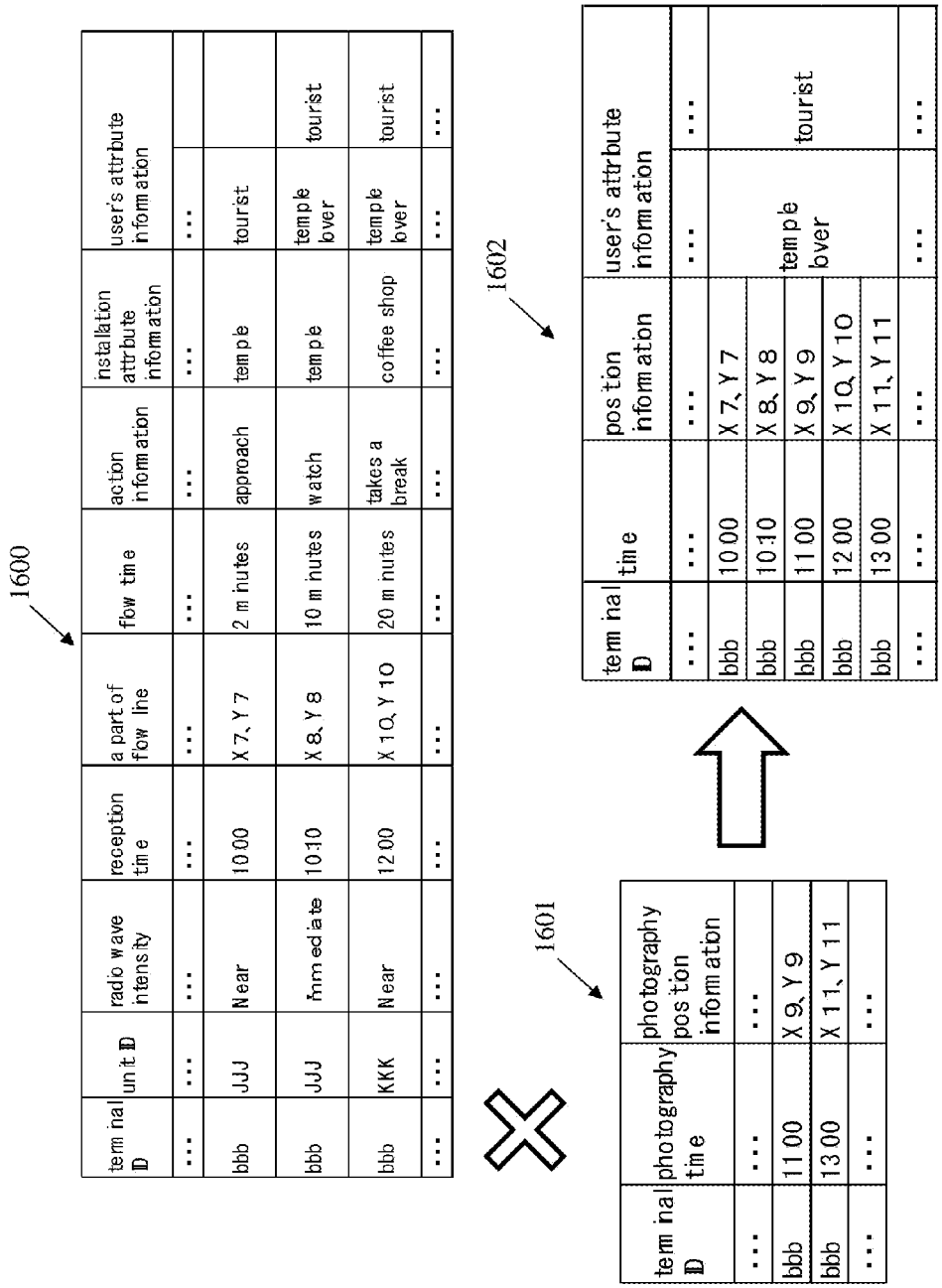
FIG. 16 is a view indicating an example of a generation of an action pattern table by combining a wireless communication table according to the invention with a contribution table.

The present invention may analyze user's action pattern in a more wide range, by combining user's movement trace information calculated by the other method. For example, the other method is method for calculating the user's movement trace information based on photography time (photography date and time) and photography position information attached to a photography image. As shown in FIG. 15, FIG. 16, when a user being a "tourist" in user's attribute information displays sightseeing contents screen 1500 in a specific application to a user terminal 10 of the terminal ID ("bbb"), the sightseeing contents screen 1500 displays advertisements of the place where the user stays and tourist attractions. When the user moves to a temple of the first spot where a wireless unit 11 is installed while watching the contents screen 1500, the user terminal 10 performs short-distance wireless communication to the wireless unit 11 of the unit ID ("JJJ"), the wireless unit 11 installed in the temple, and the notice part 208 displays sightseeing map screen 1501 concerned with the users attribute information "tourist" to the user terminal 10. The sightseeing map screen

1501 displays plural spots including the first spot where the user stays. Here, when the user watches the temple, the analysis part 207 newly adds "temple lover" to "tourist" of the users attribute information based on the users action information ("watch") and the installation attribute information ("temple") of the unit ID ("JJJ"). Thus, when the user moves to the second spot where a wireless unit 11 is not installed, photographs a photography image with the user terminal 10, and contributes the photography image and a comment to a sightseeing contribution screen 1502 in the application, photography time and photography position information attached to the photography image are stored. Thus, when the user moves to a coffee shop of the third spot where a wireless unit 11 is installed, by the short-distance wireless communication to the wireless unit 11 of the unit ID ("KKK"), the wireless unit 11 installed in the coffee shop, the notice part 208 displays sightseeing map screen 1503 concerned with the user's attribute information "tourist" to the user terminal 10. The sightseeing map screen 1503 includes detailed information of the popular coffee shop. When the user enters the coffee shop and takes a break, moves to the fourth spot where a wireless unit 11 is not installed, and contributes a comment with a photography image to a sightseeing contribution screen 1504, photography time and photography position information attached to the photography image are stored.

As shown in FIG. 16, in the spot where a wireless unit 11 is installed, for example, a part (position information) of the flow line of the user, the flow time including the reception time, user's action information, and user's attribute information in the user terminal 10 of the specific terminal ID ("bbb") can be collected to a wireless communication table 1600. And in the spot where a wireless unit 11 is not installed, by the contribution of the photography image with photography time and photography position information, for example, photography time and photography position information in the user terminal 10 of the terminal ID ("bbb") can be collected to a contribution table 1601. The photography time and photography position information are user's movement trace information. When the wireless communication table 1600 is combined with the contribution table 1601 by making the unit of a part (position information) of the flow line of the user and the flow time match the unit of the photography time and photography position information, an action pattern table 1602 chronology arranging all position information in the terminal ID ("bbb") is generated. The change of the position information of the action pattern table 1602 means users action pattern of a specific users attribute information in area including the spot with the wireless unit 11 and the spot without the wireless unit 11.

Figure 17:
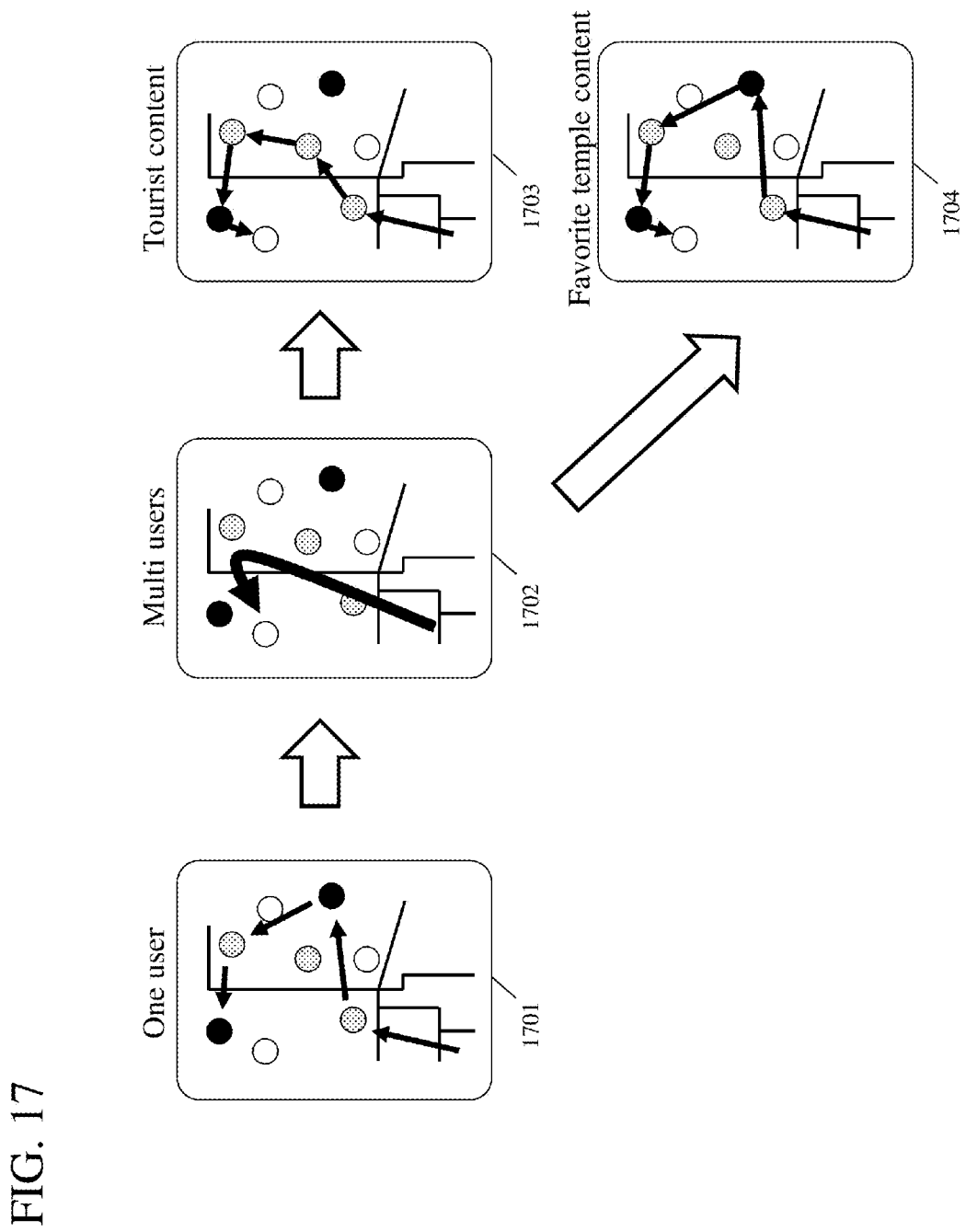
FIG. 17 is a view indicating examples of action pattern of one user, action pattern of plural users, action pattern of plural users having general user's attribute information, and action pattern of plural users having special user's attribute information.

As shown in FIG. 17, by using the action pattern table 1602 of one user having plural user's attribute information ("temple lover", "tourist"), it is possible to map the user's action pattern. And by calculating the action pattern table of plural users having the same users attribute information, it is possible to map the user's action pattern that plural users having the same user's attribute information moved in the past. In the sightseeing contents screen, by displaying the mapped action pattern 1701 to the user terminal of the user having the same user's attribute information, it is possible to provide a recommended spot to the user sequentially and guide. By mapping action pattern 1702 of plural users having general user's attribute information ("tourist") depending on the choice of the user, it is possible to guide a general route to the user.

By mapping action pattern 1703 of plural users having special user's attribute information ("temple lover"), it is possible to guide a route matching the user's preference. When the user moves based on the mapped action pattern, the action pattern of the user is stored more, and is utilized to multi user's action pattern displaying next. When the contents screen, the map screen, and the contribution screen are communalized by plural users through the application, it is possible to communicate among the users through a place.

The user terminal 10, the wireless unit 11, and server 13 in the marketing system 1 of the embodiment of the present invention are configured to include each unit, but it may be configured that a program for materializing the units is stored in a storage medium and the storage medium is provided. In such configuration, the program is read on the apparatus materializes the respective units. In this case, the program read from the storage medium provides the effect of the present invention. Additionally, the steps executed by the respective units may be stored in the hard disk.

INDUSTRIAL APPLICABILITY

As described above, a marketing system and a marketing method are useful as a system of the field for researching the needs and the hobby taste of the customer, such as a marketing research. It is effective as a marketing system and a marketing method which can analyze user's attribute information including user's preference concretely by user's action history.

REFERENCE SIGNS LIST

1 Marketing system
10 User terminal
11 Wireless unit
12 Network
13 Server
201 First communication part
202 Second communication part
203 Transmission part
204 Collection part
205 Calculation part
206 Estimation part
207 Analysis part
208 Notice part
209 Video display part
210 Display part

The invention claimed is:
1. A marketing system comprising: a first communication part being provided to a user terminal owned by a user, and sending a radio wave including a terminal ID of the user terminal regularly; a second communication part being provided to a Wi-Fi sensor installed in a specific area, and receiving a radio wave sent by the user terminal of the user who entered in the area; a transmission part being provided to the Wi-Fi sensor, and transmitting communication information including the terminal ID of the user terminal, a unit ID of the Wi-Fi sensor and radio wave intensity to a server through a network, the radio wave intensity being an intensity of the radio wave and meaning a proximity sorted for plural stages depending on a distance between the user terminal and the Wi-Fi sensor when the user terminal performs short-distance wireless communication to the Wi-Fi sensor through a radio wave; a collection part being provided to the server, and collecting a chronological change of the radio wave intensity in the terminal ID of the communication information concerned with the unit ID of the communication information when receiving the communication information; a calculation part being provided to the server, drawing a circle or a ring of which a radius is a distance corresponding to the radio wave intensity on a center of the Wi-Fi sensor of the unit ID virtually based on a collected radio wave intensity in the terminal ID concerned with the unit ID, calculating position information on the circle or the ring as a part of a flow line on which the user moved, and calculating a flow time when the user stays on the part of the flow line based on the chronological change of the radio wave intensity; an estimation part being provided to the server, and estimating user's action information indicating that the user did actually on the area of the Wi-Fi sensor of the unit ID based on the part of the flow line and the flow time; and an analysis part being provided to the server, and analyzing user's attribute information including user's preference based on the estimated user's action information and installation attribute information indicating an attribute of an installation of the Wi-Fi sensor, the installation attribute information pre-provided to the unit ID of the Wi-Fi sensor.

2. A marketing system comprising: a first communication part being provided to a user terminal owned by a user, and receiving a radio wave; a second communication part being provided to a Beacon terminal installed in a specific area, and sending a radio wave including a unit ID of the Beacon terminal regularly; a transmission part being provided to the user terminal, and transmitting communication information including a terminal ID of the user terminal, the unit ID of the Beacon terminal and radio wave intensity to a server through a network, the radio wave intensity being an intensity of the radio wave and meaning a proximity sorted for plural stages depending on a distance between the user terminal and the Beacon terminal when the user terminal performs short-distance wireless communication to the Beacon terminal through a radio wave; a collection part being provided to the server, and collecting a chronological change of the radio wave intensity in the terminal ID of the communication information concerned with the unit ID of the communication information when receiving the communication information; a calculation part being provided to the server, drawing a circle or a ring of which a radius is a distance corresponding to the radio wave intensity on a center of the Beacon terminal of the unit ID virtually based on a collected radio wave intensity in the terminal ID concerned with the unit ID, calculating position information on the circle or the ring as a part of a flow line on which the user moved, and calculating a flow time when the user stays on the part of the flow line based on the chronological change of the radio wave intensity; an estimation part being provided to the server, and estimating user's action information indicating that the user did actually on the area of the Beacon terminal of the unit ID based on the part of the flow line and the flow time; and an analysis part being provided to the server, and analyzing user's attribute information including user's preference based on the estimated user's action information and installation attribute information indicating an attribute of an installation of the Beacon terminal, the installation attribute information pre-provided to the unit ID of the Beacon terminal.

3. The marketing system according to claim 2, further comprising
a notice part identifying relevant information concerned with the user of the user's attribute information based on the analyzed user's attribute information, and, when the user terminal performs short-distance wireless communication to other wireless unit through the radio wave, displaying notice information in the identified relevant information to a video display part of an electronic equipment including a digital signage, or a display part of the user terminal through the network, the video display part or the display part located near the other wireless unit of the area where the user terminal exists.

4. A marketing method comprising steps of: a first communicating step at a user terminal owned by a user for sending a radio wave including a terminal ID of the user terminal regularly; a second communicating step at a Wi-Fi sensor installed in a specific area for receiving a radio wave sent by the user terminal of the user who entered in the area; a transmitting step at the Wi-Fi sensor for transmitting communication information including the terminal ID of the user terminal, a unit ID of the Wi-Fi sensor and radio wave intensity to a server through a network, the radio wave intensity being an intensity of the radio wave and meaning a proximity sorted for plural stages depending on a distance between the user terminal and the Wi-Fi sensor when the user terminal performs short-distance wireless communication to the Wi-Fi sensor through a radio wave; a collecting step at the server for collecting a chronological change of the radio wave intensity in the terminal ID of the communication information concerned with the unit ID of the communication information when the communication information is received; a calculating step at the server for drawing a circle or a ring of which a radius is a distance corresponding to the radio wave intensity on a center of the Wi-Fi sensor of the unit ID virtually based on a collected radio wave intensity in the terminal ID concerned with the unit ID, calculating position information on the circle or the ring as a part of a flow line on which the user moved, and calculating a flow time when the user stays on the part of the flow line based on the chronological change of the radio wave intensity; an estimating step at the server for estimating user's action information indicating that the user did actually on the area of the Wi-Fi sensor of the unit ID based on the part of the flow line and the flow time; and an analyzing step at the server for analyzing user's attribute information including user's preference based on the estimated user's action information and installation attribute information indicating an attribute of an installation of the Wi-Fi sensor, the installation attribute information pre-provided to the unit ID of the Wi-Fi sensor.

5. A marketing method comprising steps of: a first communicating step at a user terminal owned by a user for receiving a radio wave; a second communicating step at a Beacon terminal installed in a specific area for sending a radio wave including a unit ID of the Beacon terminal regularly; a transmitting step at the user terminal for transmitting communication information including a terminal ID of the user terminal, the unit ID of the Beacon terminal and radio wave intensity to a server through a network, the radio wave intensity being an intensity of the radio wave and meaning a proximity sorted for plural stages depending on a distance between the user terminal and the Beacon terminal when the user terminal performs short-distance wireless communication to the Beacon terminal through a radio wave; a collecting step at the server for collecting a chronological change of the radio wave intensity in the terminal ID of the communication information concerned with the unit ID of the communication information when the communication information is received; a calculating step at the server for drawing a circle or a ring of which a radius is a distance corresponding to the radio wave intensity on a center of the Beacon terminal of the unit ID virtually based on a collected radio wave intensity in the terminal ID concerned with the unit ID, calculating position information on the circle or the ring as a part of a flow line on which the user moved, and calculating a flow time when the user stays on the part of the flow line based on the chronological change of the radio wave intensity; an estimating step at the server for estimating user's action information indicating that the user did actually on the area of the Beacon terminal of the unit ID based on the part of the flow line and the flow time; and an analyzing step at the server for analyzing user's attribute information including user's preference based on the estimated user's action information and installation attribute information indicating an attribute of an installation of the Beacon terminal, the installation attribute information pre-provided to the unit ID of the Beacon terminal.

* * * * *